United States Patent
Lee et al.

(10) Patent No.: US 12,449,823 B1
(45) Date of Patent: Oct. 21, 2025

(54) METHOD AND SYSTEM FOR LOADING TRAYS IN DELIVERY ROBOTS WITHIN A MULTI-STORY BUILDING

(71) Applicant: Polaris3D Co., Ltd., Pohang-si (KR)

(72) Inventors: Hakjun Lee, Pohang-si (KR); Jaeyoung Hong, Pohang-si (KR); Myeonggeun Park, Pohang-si (KR); Suyeong Park, Pohang-si (KR)

(73) Assignee: Polaris3D Co., Ltd., Pohang-si (KR)

( * ) Notice: Subject to any disclaimer, the term of this patent is extended or adjusted under 35 U.S.C. 154(b) by 0 days.

(21) Appl. No.: 19/023,111

(22) Filed: Jan. 15, 2025

(30) Foreign Application Priority Data

Apr. 3, 2024 (KR) .................. 10-2024-0045211

(51) Int. Cl.
G05D 1/656 (2024.01)
G06Q 10/083 (2023.01)

(52) U.S. Cl.
CPC .......... *G05D 1/656* (2024.01); *G06Q 10/083* (2013.01)

(58) Field of Classification Search
CPC ............................. G05D 1/656; G06Q 10/083
See application file for complete search history.

(56) References Cited

U.S. PATENT DOCUMENTS

| | | | |
|---|---|---|---|
| 9,550,624 B2* | 1/2017 | Khodl | G06Q 50/40 |
| 10,134,006 B2* | 11/2018 | Pandya | G05B 19/41895 |
| 10,954,067 B1* | 3/2021 | Theobald | B25J 19/022 |
| 11,607,038 B2* | 3/2023 | Mensing | A47B 67/02 |
| 11,951,627 B2* | 4/2024 | Hong | B25J 9/1664 |
| 2009/0138122 A1* | 5/2009 | Wagner | G07F 17/0092 700/226 |
| 2015/0073589 A1* | 3/2015 | Khodl | B65G 1/1378 700/218 |
| 2019/0033868 A1* | 1/2019 | Ferguson | G05D 1/12 |
| 2023/0134120 A1* | 5/2023 | Lee | B25J 11/008 705/330 |

FOREIGN PATENT DOCUMENTS

| | | |
|---|---|---|
| KR | 10-2018-0123298 A | 11/2018 |
| KR | 10-2023-0091639 A | 6/2023 |
| KR | 10-2023-0128664 A | 9/2023 |
| KR | 10-2024-0040840 A | 3/2024 |

* cited by examiner

*Primary Examiner* — Ramsey Refai
(74) *Attorney, Agent, or Firm* — Revolution IP, PLLC

(57) ABSTRACT

The present disclosure relates to a delivery robot for providing delivery services, wherein the delivery robot includes a communication unit and one or more processors, and the one or more processors are configured to obtain delivery object information and delivery location information of the delivery object, determine a tray on which the delivery object is to be loaded based on the delivery object information, invoke a transportation means to move to the delivery location, and when recognizing that a floor included in the delivery location information has been reached, get off the transportation means and move to a destination corresponding to the delivery location information.

16 Claims, 15 Drawing Sheets

METHOD AND SYSTEM FOR LOADING TRAYS IN DELIVERY ROBOTS WITHIN A MULTI-STORY BUILDING

CROSS-REFERENCE TO RELATED APPLICATIONS

This application claims the benefit of priority under 35 U.S.C. § 119(a) to Korean Patent Application No. 10-2024-0045211, filed on Apr. 3, 2024, the entire contents of which are incorporated herein by reference. This application also claims priority to any and all other applications to which it is entitled under the Paris Convention for the Protection of Industrial Property.

BACKGROUND

1. Field

The present disclosure relates to a delivery robot, system, and method of operation of the delivery robot for delivering goods within a multi-story building.

2. Description of Related Art

With the rapid advancement of technology, various devices providing unmanned services have been emerging. In particular, advancements in robotics technology are promoting the development of robots capable of performing a wide range of tasks and services. Moreover, the progression of artificial intelligence and cloud technologies allows for more precise and secure control of robots, thereby expanding their range of applications. These technological advancements suggest that robots have now reached a level where they can safely coexist with humans in indoor environments.

For example, the use of robots for delivery, security, cleaning, or providing navigation guidance has been increasing in residential areas, tourist spots, airports, and public facilities.

The advancement of such robotics technology has enabled the provision of various services not only in outdoor environments but also in indoor spaces such as offices and apartments, where smooth movement within multi-story buildings is essential. However, existing delivery robots and systems require significant user intervention and have low levels of automation, limiting the efficiency of deliveries within multi-story buildings.

Modern buildings are becoming increasingly complex and multi-story, making efficient delivery of goods in such environments a critical challenge. In particular, vertical movement using elevators is essential for delivering goods in multi-story buildings. Existing robot delivery systems have focused on horizontal movement within single-floor environments. However, they have not been able to incorporate vertical movement. This limitation makes robotic delivery systems unsuitable for environments that require the use of elevators.

Accordingly, the present disclosure proposes an automated delivery robot system capable of effectively delivering goods within multi-story buildings, including vertical movement using elevators, to address these technical challenges.

SUMMARY

The object of this disclosure is to develop a delivery robot system that can efficiently move objects vertically using an elevator in a multi-story building.

The object of this disclosure is to develop a system that utilizes a delivery application and a delivery robot to make effective deliveries based on user orders.

The object of this disclosure is to develop a robot that can acquire delivery object information through NFC tags and, based on the information, deliver the delivery object to a precise location within a multi-story building.

The object of this disclosure is to develop a function for automatically selecting and entering a floor when a robot moves within a multi-story building using an elevator.

Further, the purpose of this disclosure is to minimize the interaction between a user and a robot in a multi-story building and improve the user experience.

According to an embodiment of the present invention, a delivery robot providing a delivery service may include a communication unit, at least one or more processors, the processors, obtaining delivery object information and delivery location information of a delivery object, determining, based on the delivery object information, a tray on which the delivery object is to be loaded, calling a transportation vehicle for traveling to the delivery location information, and, upon recognizing that a "floor" included in the delivery location information has been reached, disembarking the transportation vehicle and traveling to a destination corresponding to the delivery location information.

Further, the delivery object information and delivery location information may be obtained using a short-range communication, the short-range communication may include any one of NFC, RFID, WIFI, and Bluetooth.

In addition, when determining a tray to load the delivery object, the one or more processors may determine the tray to load using an artificial intelligence model trained to output tray information to be loaded when the delivery object information is input.

Further, the artificial intelligence model may be trained to determine an output value based on data labeled to select a particular tray based on a tray assignment condition corresponding to the delivery object when the delivery object information is input.

In addition, the delivery robot may include a weight sensor provided on the tray and a camera capable of obtaining an image of the tray, and the one or more processors may, using the weight sensor and the camera, obtain weight information and delivery object image information of the tray, and compare the weight information and the delivery object image information obtained with the delivery object information to determine whether an object has been placed on the tray to be loaded.

In addition, when the delivery object is loaded onto the tray, the one or more processors may set a security code for the delivery object based on the destination information included in the delivery location information.

Further, the delivery object information may include at least one of a weight, an image, a size, a type, and a storage temperature of the delivery object.

In addition, the one or more processors may obtain delivery location information, delivery object information, and batch loading information for each of the plurality of delivery objects when a plurality of delivery objects exists, and if the batch loading information of each of the plurality of delivery objects is "possible," determine a feasibility of batch loading based on the delivery object information of each of the plurality of delivery objects, and determine a delivery priority for the plurality of objects.

In addition, when determining the feasibility of batch loading, the one or more processors may determine the waiting availability based on the type of each of the plurality of delivery objects and the delivery request time, and determine that if the difference between the estimated loading time of the first object and the second object of the plurality of delivery objects is less than a certain time, each of the plurality of delivery objects can be loaded simultaneously on the tray, or if the destination arrival time for the first object after loading of the first object and the second object is within the delivery request time of the first object.

Further, when determining a delivery priority for each of the plurality of delivery objects, the one or more processors may determine the delivery priority based on at least one of a floor travel time, a suitable time for storing the delivery object, a type of delivery object, and an order time for each of the plurality of delivery objects included in the delivery object information of each of the plurality of delivery objects.

In addition, the one or more processors may assign each of the plurality of delivery objects to each of the plurality of trays.

It may also be disclosed a method of operation of a delivery robot providing a delivery service, the method of operation of the delivery robot comprising: obtaining delivery object information and delivery location information of the delivery objects; determining, based on the delivery object information, a tray to be loaded with the delivery objects; calling a mobile vehicle to move to the delivery location information; recognizing that a destination included in the delivery location information has been reached; and discharging the mobile vehicle.

Further, the step of obtaining the delivery object information and the delivery location information of the delivery object may include obtaining the delivery object information and the delivery location information using a short-range communication, wherein the short-range communication may include any one of NFC, RFID, WIFI, and Bluetooth.

Further, determining a tray to be loaded with the delivery object may include determining the tray to be loaded using an artificial intelligence model trained to output tray information to be loaded when the delivery object information is input.

In addition, the artificial intelligence model may be trained to determine an output value based on data labeled to select a specific tray based on a tray assignment condition corresponding to the delivery object when the delivery object information is input.

The method may further include obtaining weight information and delivery object image information of the tray, and comparing the weight information and the delivery object image information with the delivery object information to determine whether an object is placed on the tray to be loaded.

It may further include, after determining a tray to be loaded with the delivery object based on the delivery object information, setting a security code for the delivery object based on the destination information included in the delivery location information.

In addition, obtaining delivery object information and delivery location information of a delivery object may further include obtaining delivery location information, delivery object information and batch loading information for each of the plurality of delivery objects, if a plurality of delivery objects exists, and if the batch loading information of each of the plurality of delivery objects is "possible", determining the feasibility of batch loading based on the delivery object information of each of the plurality of delivery objects and determining a delivery priority for the plurality of objects.

In addition, determining the feasibility of batch loading may further include determining the waiting availability based on the type of each of the plurality of delivery objects, the delivery request time, and the step of determining that if the difference between the estimated loading time of the first object and the second object of the plurality of delivery objects is less than a predetermined time, each of the plurality of delivery objects can be loaded simultaneously on the tray, or if the destination arrival time for the first object after loading of the first object and the second object is within the delivery request time of the first delivery object.

Further, the step of determining a delivery priority for the plurality of objects may include determining the delivery priority based on at least one of a floor travel time, a suitable time for storing the delivery object, a type of delivery object, and an order time for each of the plurality of delivery objects included in the delivery object information of each of the plurality of delivery objects.

BRIEF DESCRIPTION OF THE DRAWINGS

FIG. 13 is a diagram to illustrate prioritization by grid, according to embodiments of the present invention.

DETAILED DESCRIPTION

Figure 1:
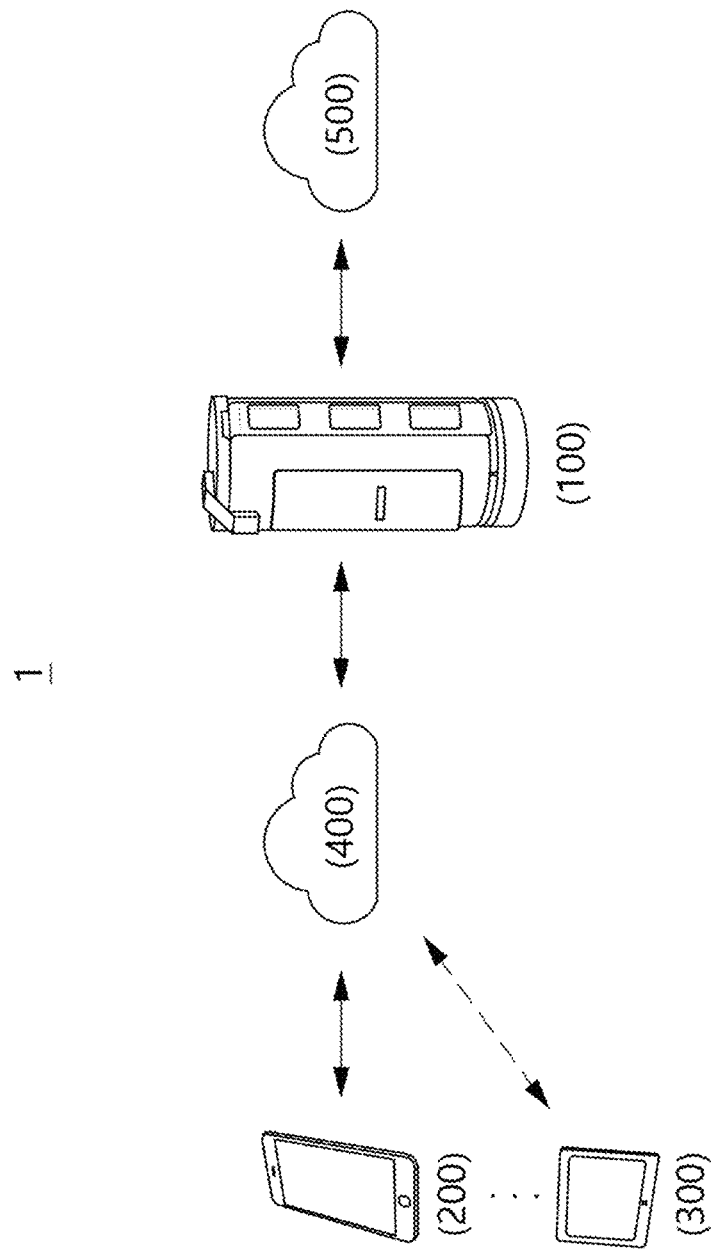
FIG. 1 is a diagram illustrating a delivery robot system 1 according to an embodiment of the present invention.

The present invention may be variously modified and have various embodiments, and specific embodiments are illustrated in the drawings and will be described in detail in the detailed description. However, this is not intended to limit the present invention to specific embodiments, and it should be understood that all changes, equivalents, or alternatives included in the spirit and scope of the present invention are included. In describing each figure, similar reference numerals were used for similar components. The terms first, second, a, b, etc., may be used to describe various elements, but these elements should not be limited by these terms. The terms are used only for the purpose of distinguishing one element from another. For example, the first component may be named a second component without departing from the scope of the present invention, and similarly, the second component may be named the first component. The term "and/or" includes any combination of a plurality of associated listed objects or any of a plurality of associated listed objects. It should be understood that when an element is referred to as being "connected" or "connected" to another element, it may be directly connected or connected to the other element, but other elements may be present in the middle. On the other hand, when an element is referred to as being "directly connected" or "directly connected" to another element, it should be understood that there are no other elements in the middle. The terminology used in this application is used merely to describe specific embodiments, and is not intended to limit the present invention. The expression of a singular includes multiple expressions unless the context clearly means otherwise. In the present application, the term "include" or "have" should be understood to designate the presence of features, numbers, steps, operations, components, parts or combinations thereof described in the specification, but not exclude the presence or addition of one or more other features, numbers, steps, operations, components, parts or combinations thereof. Unless defined otherwise, all terms used herein, including technical or scientific terms, have the same meaning as commonly understood by one of ordinary skill in the art to which this invention belongs. Terms such as those defined in commonly used dictionaries should be interpreted as having a meaning that is consistent with their meaning in the context of the relevant art and are not interpreted in an idealized or overly formal sense unless expressly so defined herein. Hereinafter, preferred embodiments of the present invention will be described in more detail with reference to the accompanying drawings. In the description of the present invention, the same reference numerals are used for the same components in the drawings to facilitate the overall understanding, and duplicate descriptions of the same components will be omitted.

Hereinafter, a delivery robot, an operation method, and a system according to an embodiment of the present disclosure will be described.

The present disclosure relates to a robot that provides delivery services in a multi-story building and seeks to improve a robot that has previously been unable to move easily between floors of a multi-story building.

More specifically, the present disclosure discloses a delivery robot, a system for controlling the delivery robot, and a method for providing useful services to a user using the delivery robot.

First, a delivery robot, system according to an embodiment of the present disclosure is defined.

In the present invention, a delivery robot 100 may include a robot that performs a service of transporting a delivery object to a receiving destination, either autonomously or by remote control. The delivery robot 100 may include various sensors, control algorithms, and communication capabilities to recognize the surrounding environment, avoid obstacles, and safely deliver delivery objects to a destination by an optimal route.

In the present invention, a system (1) for controlling a delivery robot may include a delivery robot, an electronic device or software (e.g., a control server) that directs and manages the behavior of the delivery robot. The control server may control various functions of the delivery robot, including routing, determining a destination, avoiding obstacles, controlling elevator operation, and communicating with a user. It can also perform functions such as monitoring the status of the delivery robot and responding to problems when they occur.

In the present invention, a multi-story building may refer to a building comprising multiple floors within one architectural structure. Each floor of the building may provide space for residential, business, commercial, or other activities. A multi-story building may provide access between floors via vertical transportation, such as elevators or stairs.

In the present invention, an elevator is a mechanical device designed to move people or objects vertically within a multi-story building. The elevator may function to move to a desired floor via physical buttons inside or via an automated system.

In the present invention, a user terminal may include an electronic device used by a user to transmit delivery commands or information to a delivery robot. It may include a smartphone, tablet, computer, or a dedicated interface, and may include an application or web-based interface to communicate commands to the robot, check delivery status, and enable interaction between the user and the robot. It should also be interpreted to include cases where the information being transmitted is transmitted directly from the user terminal to the delivery robot, or indirectly through an intermediary information delivery medium.

Hereinafter, the present invention will be described in more detail with reference to the accompanying drawings.

FIG. 1 illustrates a delivery robot system 1 according to an embodiment of the present invention.

Referring to FIG. 1, a system 1 for providing a delivery service may include a delivery robot 100 for providing a delivery service, at least one user terminal 200, 300, and a server 400.

According to one embodiment of the present disclosure, the delivery robot 100, the server 400, and the at least one terminal 200, 300 may be interconnected via wireless and/or wired to transmit and receive delivery information.

Specifically, the server 400 is a central hub for transmitting and receiving delivery object information and delivery location information. For example, the server 400 may correspond to a delivery application server and may process information sent and received from at least one user terminal.

Furthermore, the server 400 may send commands to the delivery robot 100. The server 400 may manage various data, such as information about delivery objects, delivery routes, delivery location information, and status of the robot, and may support efficient operation of the system as a whole.

According to an embodiment of the present invention, the delivery robot 100 may include an autonomous robot that performs the task of automatically transporting objects to a delivery destination. The delivery robot 100 may utilize a short-range communication technology such as NFC to receive delivery object information and delivery location information obtained from a user terminal, and may proceed with delivery to a destination within a multi-story building.

According to an embodiment of the present invention, the user terminals 200, 300 are electronic devices that allow a user to place a delivery order and transmit information about the delivery object to a server. The user terminals may include smartphones, tablets, laptops, and the like, and may be provided with a delivery application or web interface to enable users to easily utilize the delivery service.

According to an embodiment of the present invention, an information transmission medium (not shown) is a medium for transmitting information received from a user terminal to a delivery robot, i.e., a medium for transmitting information about a delivery object while the delivery object is being delivered from a delivery start location where the delivery object starts to an entrance of a multi-story building.

The information transmission medium may include various means for transmitting information, and may be implemented as an electronic device, a terminal, an NFC tag, an RFID, or the like.

The information transmission medium receives delivery object information and delivery location information and transmits the information to the delivery robot using a short-range communication technology such as NFC.

The information transmission medium may be transmitted to the delivery robot by the delivery person during the delivery process.

The operation of the system according to an embodiment of the present invention is as follows.

A user may request delivery of a delivery object via the user terminal 200. The user terminal 200 may generate delivery object information and delivery location information for the delivery object. The generated delivery object information and delivery location information may be transmitted to the server 400.

The server 400 may process the received delivery object information and the delivery location information and transmit the received delivery object information and the delivery location information to an information transmission medium or a delivery robot.

The information delivery medium may be picked up by the delivery person and transmit the delivery object information and the delivery location information to the delivery robot. For example, the information delivery medium is moved to a multi-story building by the delivery person, and the information delivery medium transmits the delivery object information and the delivery location information to a delivery robot present in the multi-story building using short-range communication.

The delivery robot starts delivery based on the obtained delivery object information and the delivery location information.

According to various embodiments of the present invention, the system for controlling the delivery robot may further comprise a robot control server 500.

The robot control server 500 is a server for controlling at least one delivery robot, and may collect, process, and analyze all operational data of the delivery robot.

The robot control server 500 can monitor the location, battery level, working status, delivery route, etc. of the robot in real time, calculate the optimal delivery route, and instruct the robot. It can also serve as a central command center to take immediate response measures in the event of an unexpected situation.

When the above robot control server 500 exists, when a user requests delivery of a delivery object through a user terminal, the server 400 may transmit delivery object information and delivery location information to the delivery robots existing in the multi-story building using an information transmission medium in the same manner as the previous method.

The delivery robot 100 may transmit the delivery object information and the delivery location information to the robot control server 500, and the robot control server 500 may calculate an optimal delivery route and control the delivery robot to perform correct delivery.

Depending on the embodiment, it may be possible for the server 400 to directly transmit the delivery object information and the delivery location information to the robot control server 500, or for the information transmission medium to transmit the delivery object information and the delivery location information to the robot control server 500.

Figure 2:
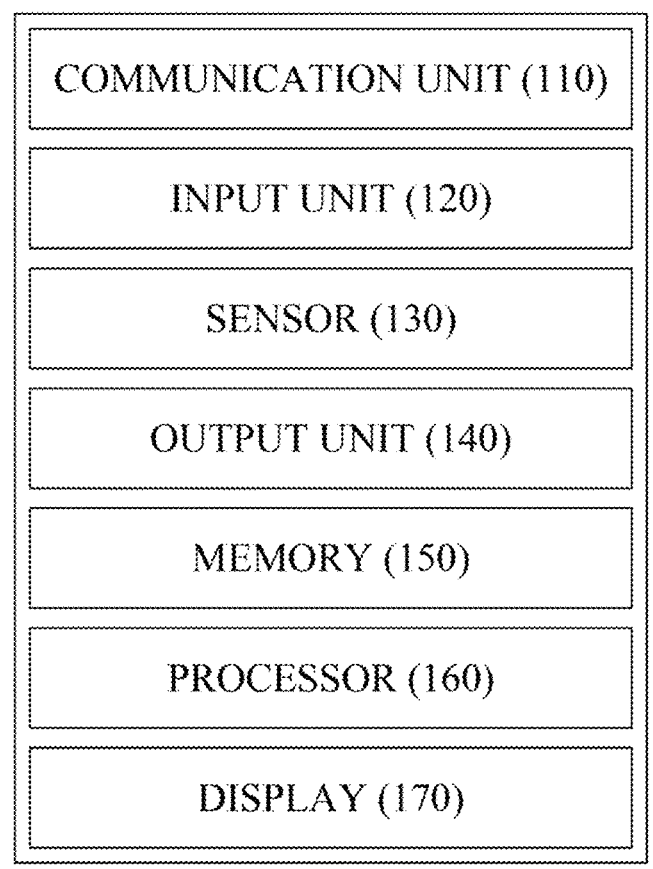
FIG. 2 is a block diagram illustrating a configuration of a delivery robot according to an embodiment of the present invention.

Referring to FIG. 2, a configuration of the delivery robot 100 according to an embodiment of the present invention will be described.

FIG. 2 is a block diagram illustrating components of the delivery robot 100 according to one embodiment of the present disclosure.

Referring to FIG. 2, the delivery robot may include a communication UNIT 110, an input unit 120, a sensor unit 130, an output unit 140, a memory 150, one or more processors 160, and a display 170.

The communication unit 110 can transmit and receive data with external devices such as other electronic devices or servers using wired and wireless communication. For example, the communication unit can transmit and receive sensor information, user input, artificial intelligence models, control signals, etc. with external devices.

At this time, the communication technologies used by the communication unit 110 include GSM (Global System for Mobile communication), CDMA (Code Division Multi Access), LTE (Long Term Evolution), 5G, WLAN (Wireless LAN), Wi-Fi (Wireless-Fidelity), Bluetooth (Bluetooth™), RFID (Radio Frequency Identification), Infrared Data Association (IrDA), ZigBee, NFC (Near Field Communication), etc.

The input unit can obtain various types of data.

At this time, the input unit 120 may include a camera for inputting a video signal, a microphone for receiving an audio signal, a user input unit for receiving information from a user, etc. Here, the camera or microphone may be treated as a sensor, and the signal obtained from the camera or microphone may be referred to as sensing data or sensor information.

The sensing unit (sensor) 130 can obtain at least one of the surrounding environment information, path search, obstacle detection, and other interaction information using various sensors.

At this time, the sensors included in the sensing unit 130 may include a weight sensor, a proximity sensor, a light sensor, an acceleration sensor, a magnetic sensor, a gyro sensor, an inertial sensor, an RGB sensor, an IR sensor, an NFC sensor, an ultrasonic sensor, a light sensor, a microphone, a lidar, a radar, etc.

The display 170 can generate output related to vision, hearing, or touch.

At this time, the display 170 can include a display unit that outputs visual information, a speaker that outputs auditory information, a haptic module that outputs tactile information, etc.

The memory 150 can store data that supports various functions of the delivery robot. For example, the memory can store input data obtained from the input unit, various data obtained from a server or a connected device.

A processor 160 configured to perform a specific operation may be configured to perform the specific operation, and may be designed in hardware as well as may mean a computer structured through programming to perform the specific operation.

The processor 160 may determine at least one executable operation of the delivery robot. And the processor may control components of the delivery robot to perform the determined operation.

To this end, the processor may request, search, receive, or utilize data in the memory, and may control components of the delivery robot to perform an operation that is predicted or determined to be desirable among the at least one executable operation.

Figure 3:
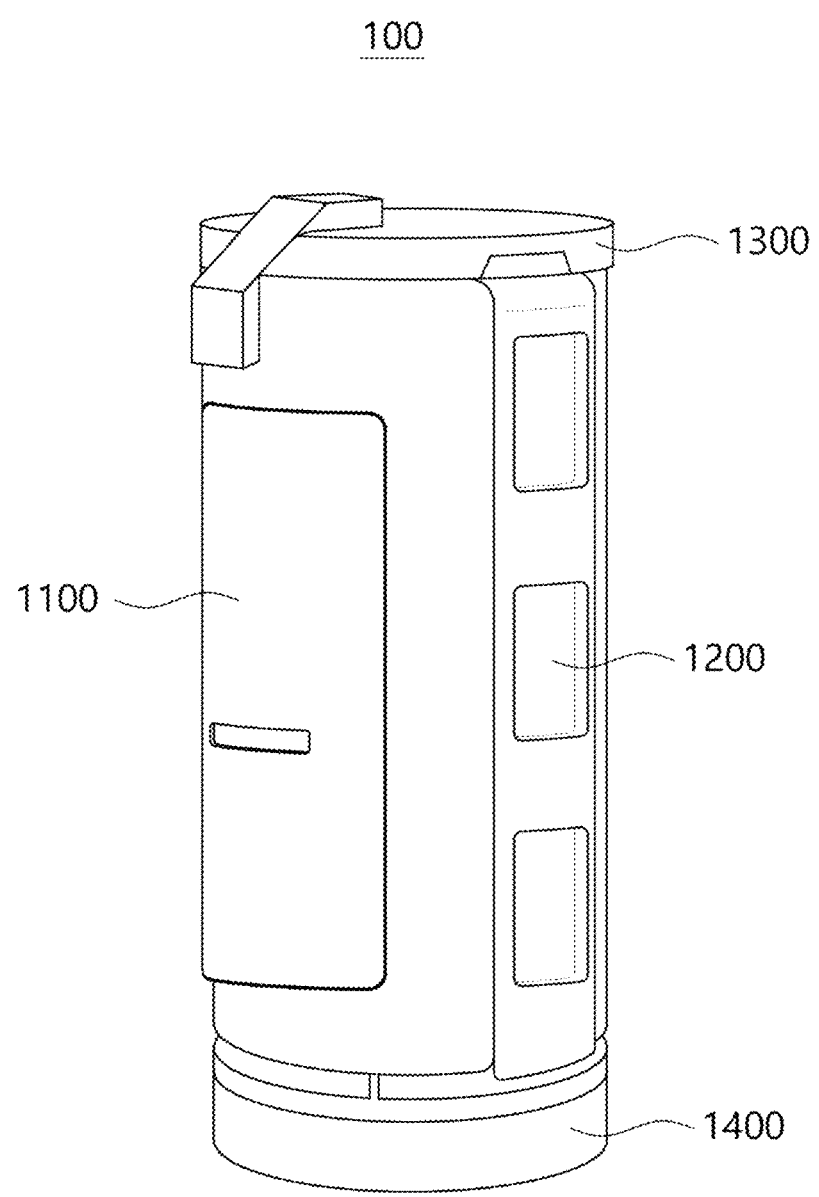
FIG. 3 is a block diagram illustrating a configuration of a delivery robot according to an embodiment of the present invention.

FIG. 3 shows the configuration of a delivery robot according to an embodiment of the present invention.

Referring to FIG. 3, the delivery robot 100 may include a body part 1100 including at least one tray on which an object can be placed or transported, a side part (1200), an upper part (1300), and a driving part (1400) formed by being connected to the body part.

According to one embodiment of the present disclosure, the body part (1100) of the delivery robot may include at least one tray on which an object to be transported can be placed.

According to one embodiment of the present disclosure, a sensor such as a camera or a weight sensor may be attached to the body part (1100) of the delivery robot. A camera may be attached to each tray of the delivery robot or to the upper part of the tray. A camera capable of obtaining an image or video of the tray may obtain information on the presence or absence of a loaded object, its type, amount, etc. In one embodiment, a weight sensor may be included in the tray of the delivery robot. The weight sensor may estimate whether an object is placed on the tray and the amount of the object. The presence, shape, number, and height of the tray are not limited to those shown in the drawing above.

The upper part (1300) and the side part (1200) are classified by location for the purpose of explaining the sensor, etc., and may be configured in an integrated form or may be configured by separating them into multiple lower elements.

According to various embodiments of the present disclosure, the delivery robot can obtain images or video through each camera installed in the driving direction and the side of the driving direction of the delivery robot.

According to one embodiment of the present disclosure, when the robot drives, information about the destination of the drive can be obtained mainly through the camera located in the driving direction, and information other than the driving direction can be additionally obtained through the camera on the side.

In the present disclosure, in addition to the camera for obtaining information in space, the robot can include a separate camera for obtaining information about the objects in the tray. At this time, the camera can be located at the bottom of the upper part (1300) or the bottom of each tray. The robot may include multiple trays, and if a camera is positioned at the bottom of the tray, the installed camera may obtain information about an object placed on the tray located at the bottom of the tray where the camera is installed. The camera may obtain information about whether an object has been provided in response to an order, what type of object it is, whether the object has been properly transported and removed from the tray, etc. In addition to the camera, information about an object placed on the tray may be obtained through a weight sensor, etc.

According to various examples of the present disclosure, the robot may include a speaker capable of performing a voice function. If it is determined that the delivery of an object has been completed, an additional voice related to the completion of the delivery may be provided. The robot may determine that the delivery of an object or food, etc. has been completed through the camera sensor or weight sensor of the tray and may additionally provide a voice in response thereto.

The robot of the present disclosure may not implement or include all of the functions described above at the same time, and may function by including only some functions depending on the user's settings or the characteristics of the robot, the space, and the purpose of use.

Figure 4:
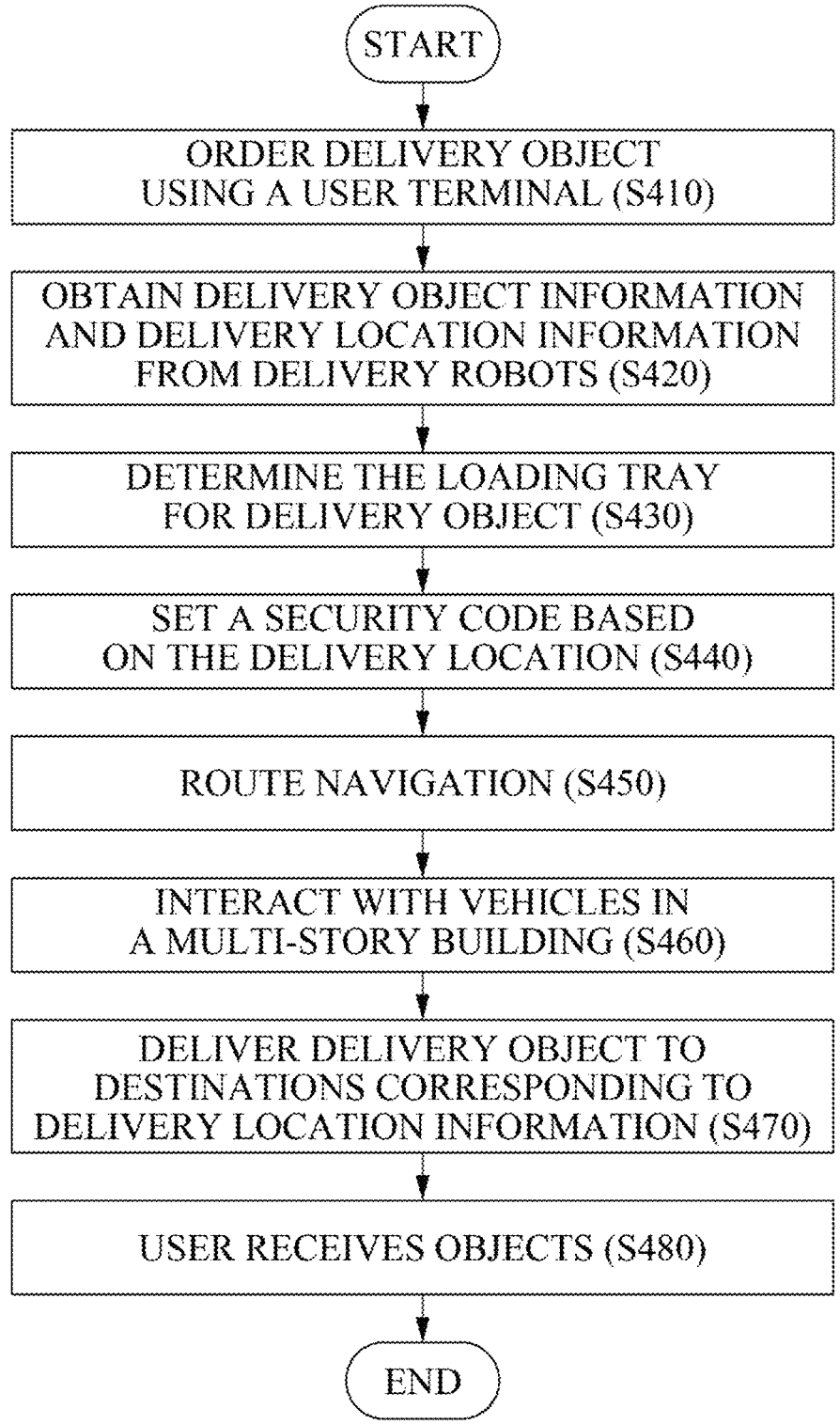
FIG. 4 is a flowchart illustrating an operation sequence of a delivery robot according to an embodiment of the present invention.

FIG. 4 is a flowchart illustrating a scenario of an overall operation flowchart of a delivery robot according to an embodiment of the present disclosure.

Referring to FIG. 4, the present disclosure may provide a delivery robot system that automates a process from ordering a delivery object via a user terminal to receiving the delivery object by a user.

According to an embodiment of the present disclosure, a user may order a delivery object using a user terminal (S410). Specifically, the user may select a delivery object using a delivery application installed on the user terminal and enter delivery location information corresponding to the delivery object.

At this time, the delivery object information can include at least one of the weight, image, size, type, storage temperature, and user request information of the delivery object.

In addition, the delivery location information may include the delivery destination (room, guest room, specific location, etc.).

This allows the delivery order to be completed. The above delivery object information and delivery location information may be transmitted to the application server (400).

The application server 400 may process the order information received from the user terminal to request a delivery object provider (e.g., various delivery object providers such as restaurants, warehouses, etc.) to prepare the delivery object. The above process may be accomplished as follows.

The application server (400) may transmit the delivery object information (type of object, quantity, request, etc.) and delivery location information to the terminal held by the object provider.

The object provider may prepare the object based on the information, and may transmit whether the preparation is complete to the application server 400.

According to an embodiment of the present invention, when the user completes the delivery order, the application server 400 may transmit the delivery object information and the delivery location information to the information transmission medium.

If necessary, the delivery person may pick up the information transmission medium and the delivery object at the delivery location based on the order information. Then, the delivery person may move to the designated location to deliver the delivery object to the delivery robot.

According to an embodiment of the present invention, the delivery robot 100 may acquire delivery object information and delivery location information (S420).

Specifically, the delivery robot may obtain the delivery object information and the delivery location information from an information transmission medium.

For example, the delivery person may transmit the delivery object information and the delivery location information to the delivery robot via an NFC tag or other short-range communication means using the information transmission medium.

At this time, the delivery robot 100 may be connected to the robot control server 500, or may act independently, and may receive the delivery object information and the delivery location information from the information transmission medium via the NFC tag or other short-range communication means to initiate delivery.

Operation of the Delivery Robot after Acquiring Delivery Object Information and Delivery Location Information According to an embodiment of the present invention, the one or more processors 160 of the delivery robot 100 may determine (S430), based on the delivery object information, which of the at least one trays provided in the delivery robot is to be loaded with the delivery object.

Thereafter, the one or more processors 160 of the delivery robot 100 may set a security code for the tray once the delivery object is loaded into the tray (S440).

Thereafter, the processor 160 may perform route navigation to move to a delivery destination corresponding to the delivery location information (S450).

In addition, the one or more processors may perform an interaction (S460) to invoke and control a means of transportation for traveling to a delivery destination corresponding to the delivery location information when traveling within the multi-story building.

The means of transportation may include various means capable of vertical movement within a multi-story building, but elevators are described herein as an example.

Interacting with the means of transportation may include the delivery robot invoking the means of transportation, moving to an internal location to control the means of transportation, and performing security authentication to control the means of transportation. This will be described in more detail later.

According to an embodiment of the present invention, when the processor reaches a delivery destination floor in a multi-story building, the processor may disembark the mobile means and the delivery robot may deliver the delivery object to a destination corresponding to the delivery location information (S470).

In this case, the delivery destination floor in the multi-story building may be different from the floor on which the delivery robot was initially placed.

Then, when the user receives a signal to release the security code of the tray in which the objects are stored, the delivery robot may provide the objects loaded in the tray to the user (S480).

Through the above process, the delivery robot may deliver the delivery object to the destination based on the information obtained.

This allows the delivery process to be optimized through a cooperative division of roles between the application management server 400, the user terminals 200, 300, and the delivery robot 100.

In addition, when an information transmission medium is used, by transmitting delivery object information and delivery location information via short-range communication between the information transmission medium and the delivery robot, the delivery robot 100 may be able to efficiently perform delivery missions without relying on a complex network infrastructure.

A more detailed embodiment will be described below based on the flowchart illustrated in FIG. 4.

Delivery Robot Behavior Before Interacting with a Vehicle

Figure 5:
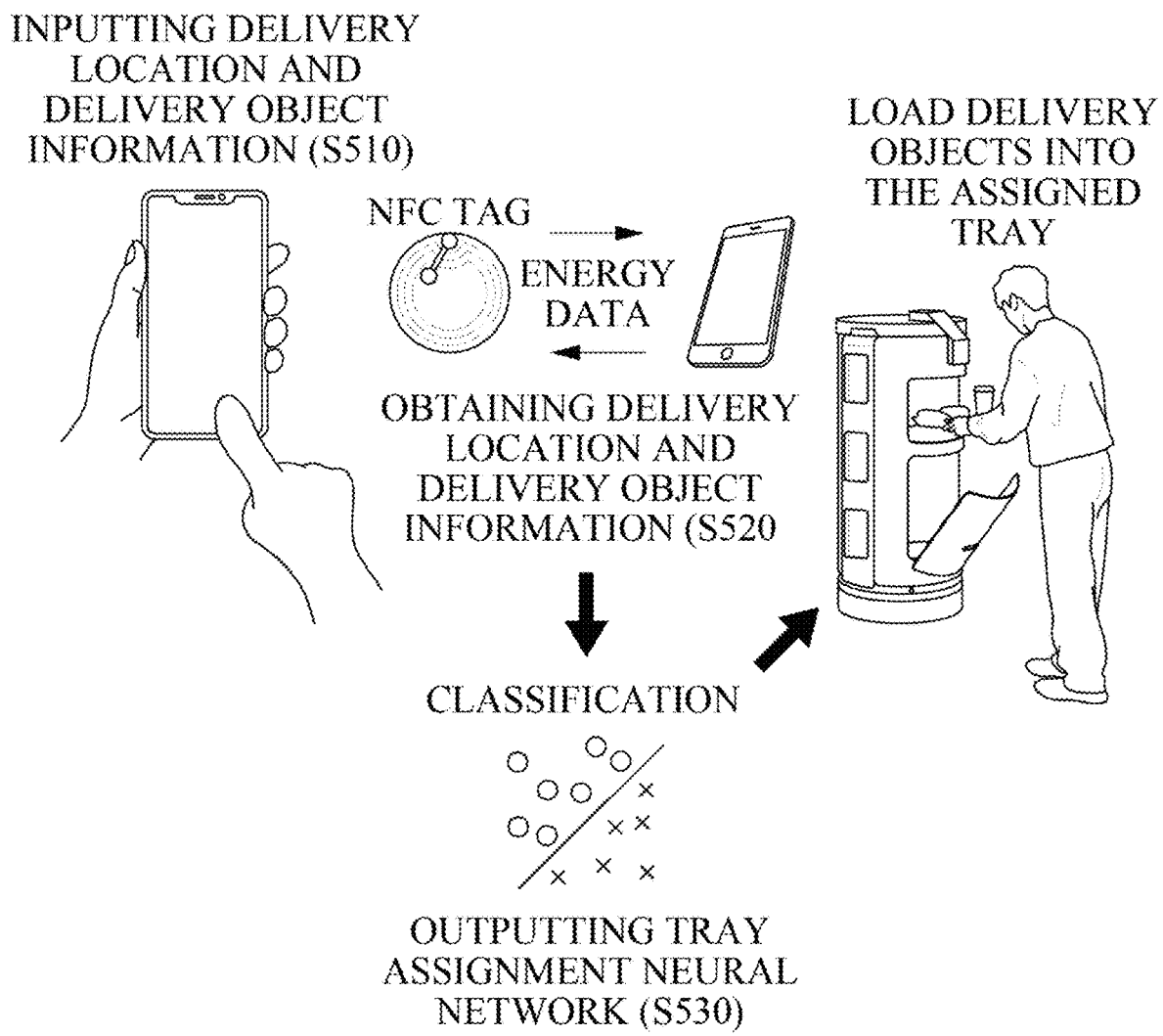
FIG. 5 is a diagram illustrating a loading operation of a delivery object according to an embodiment of the present invention.
Figure 6:
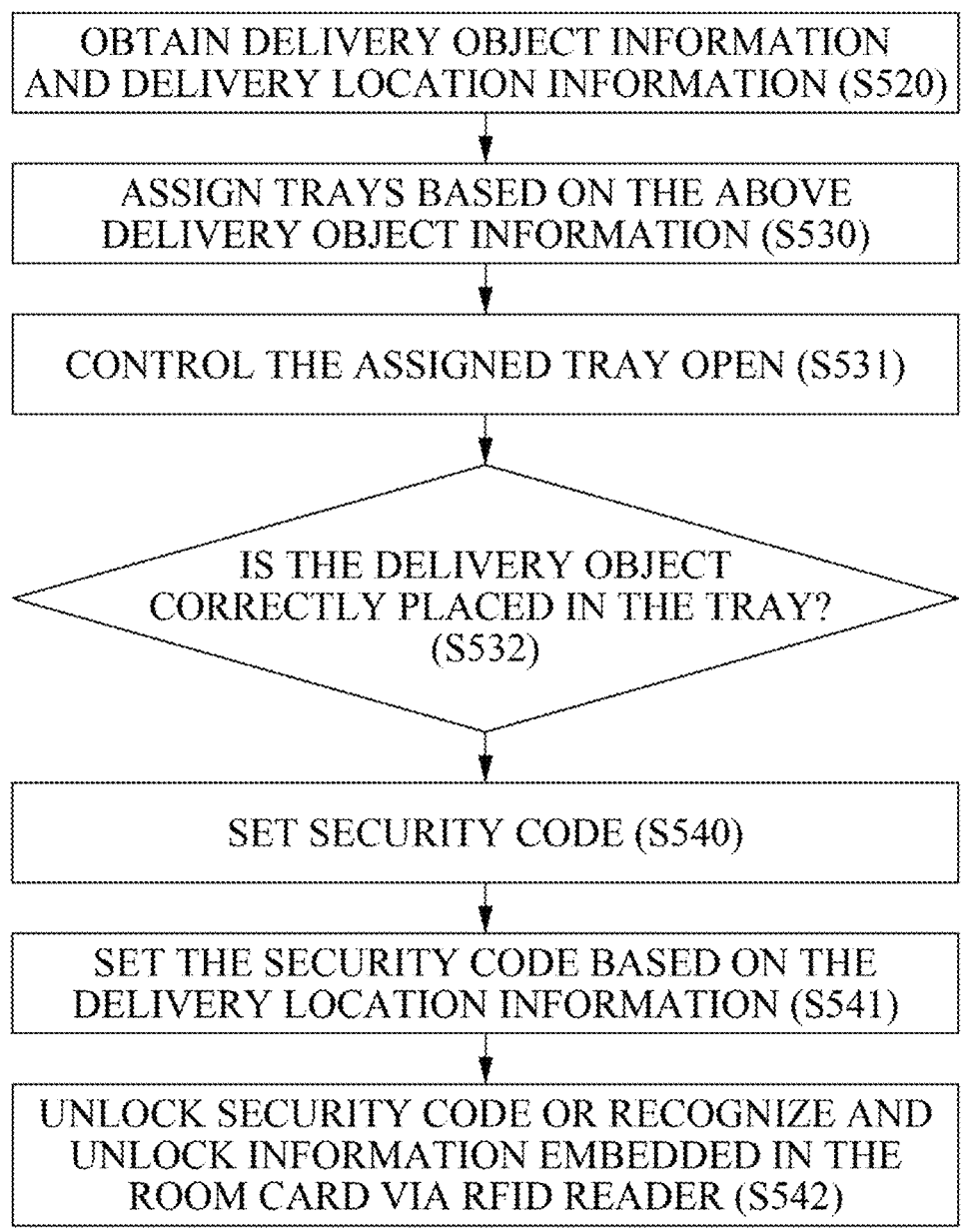
FIG. 6 is a flowchart illustrating a loading operation of a delivery object according to an embodiment of the present invention.

FIGS. 5 and 6 are conceptual diagrams and flowcharts illustrating a method of loading a delivery object of a delivery robot according to an embodiment of the present invention.

Referring to FIG. 5, a user may order a delivery object using a user terminal (S510).

At this time, the user terminal may obtain delivery object information corresponding to the delivery object and delivery location information.

For example, the delivery object information may include at least one of a weight, an image, a size, a type, and a storage temperature of the object to be delivered. Further, the delivery location information may include at least one of a delivery destination, a delivery destination floor, and an orderer information.

According to an embodiment of the present invention, the delivery robot 100 may obtain delivery object information and delivery location information (S520).

Specifically, according to an embodiment of the present invention, one or more processors controlling the operation of the delivery robot may obtain the delivery object information and the delivery location information using short-range communication.

In this case, the short-range communication may include NFC tags, RFID, WiFi, Bluetooth, and the like.

For example, the sensing part 130 of the delivery robot may include an NFC sensor. Specifically, the delivery robot 100 may be equipped with an NFC reader capable of reading information from an NFC tag.

The NFC reader may preferably be disposed on a upper tray or upper part of the delivery robot to allow a user or delivery medium terminal to conveniently access the delivery robot.

Meanwhile, as described above, an entity that transmits delivery object information and delivery location information to the delivery robot 100 may be an information delivery medium.

According to an embodiment of the present invention, the information transmission medium can obtain delivery object information and delivery location information from a server or a user terminal. The input information can be stored in the form of a beacon, RFID, NFC tag, QR code, etc., depending on the implementation embodiment of short-range communication.

The beacon, RFID, NFC tag, QR code, etc. above can be attached to the delivery object or stored in the terminal in a form that can be scanned by the delivery robot.

FIG. 5 illustrates, but is not limited to, a case where the information transmission medium is an NFC tag. The following describes an embodiment when the information transmission medium is implemented as an NFC tag.

The information transmitter can approach the information transmission medium to the delivery robot (100). The communication unit of the delivery robot (100) can automatically scan the NFC tag information of the information transmission terminal using an NFC reader and transmit the delivery object information and the delivery location information to the processor of the delivery robot (100). Thereafter, the processor may analyze the obtained information and generate a route for the robot to guide the delivery object to the correct delivery location.

On the other hand, in addition to the short-range communication requiring NFC tags and readers, it may also be possible for the delivery application server to communicate with the delivery robot to transmit the above delivery object information and the delivery location information.

Then, one or more processors of the delivery robot may determine a tray on which to load the delivery object based on the obtained delivery object information (S530).

When determining a tray on which to load an object based on the delivery object information, the one or more processors may determine the tray using an artificial intelligence model trained to output tray information on which the delivery object is to be loaded when the delivery object information is input.

In particular, one or more processors of the delivery robot may determine an optimal tray on which to load the delivery object using a trained artificial intelligence model when delivery object information is input.

At this time, the artificial intelligence model may include a binary classification model or a multi-class classification model.

When the delivery object information is input, the artificial intelligence model can be trained to determine an output value based on labeled data to select a specific tray according to tray assignment conditions (e.g., type of delivery object, presence or absence of food, size, optimal object by layer, etc.) corresponding to the delivery object information.

For example, the one or more processors may collect information about delivery objects, including various sizes, types, presence of food, etc., in an actual delivery environment.

The processor may train the artificial intelligence model on the collected information using training data labeled with appropriate trays for each delivery object.

For example, the labeled training data may be defined as "large objects—first floor tray", "food—refrigerated tray", "small objects—second floor tray", etc.

Based on the collected data, the AI model can be trained to output the tray most suitable for the information when the delivery object information is input. The above process can be performed in a supervised learning manner, and the model can select the tray most suitable for each situation using the labeled data.

The delivery robot 100 according to an embodiment of the present invention may OPEN a tray to which a delivery object is to be assigned based on the trays output by the artificial intelligence model (see FIG. 6, S531). If the at least one tray of the delivery robot is not equipped with a separate door, this operation may be omitted.

In accordance with embodiments of the present invention, one or more processors 160 of the delivery robot may determine whether a delivery object is properly placed in an assigned tray (S532).

Specifically, the delivery robot may determine whether the objects are loaded via a weight sensor and a camera provided on each tray. Further, the one or more processors 160 may obtain weight information and image information of the delivery object via the weight sensor and camera of the tray to be loaded.

Thereafter, the one or more processors 160 may compare the acquired weight information and the delivery object image information with the weight of the delivery object and the type of the delivery object included in the delivery object information to determine whether the delivery object is loaded.

In other words, since the delivery object information includes at least one of the information of weight, image, size, type, and storage temperature of the object to be delivered, it is possible to determine whether the delivery object is loaded if the above information exists within a margin of error.

According to an embodiment of the present invention, the one or more processors 160 of the delivery robot may set a security code based on the delivery location information (S540, S541).

According to an embodiment of the present invention, the one or more processors 160 of the delivery robot may set a security code based on the delivery location information. Specifically, the one or more processors 160 of the delivery robot may generate a security code for a delivery object based on information included in the delivery location information.

For example, if the delivery location information is "Room 301, Gangnam Building, Gangnam-gu, Seoul, Korea", the one or more processors may generate a security code based on the delivery destination included in the delivery location information. The one or more processors may set the security code by extracting a specific number or string.

For example, in the case of a string, the number "301" may be set as the security code of the tray in which the delivery object is loaded.

Further, the one or more processors may set the security code based on the orderer information included in the delivery location information.

Specifically, the orderer information may comprise identification information capable of identifying the orderer. The identification information may be generated decodable by a medium such as an RFID, QR code, NFC tag, or the like.

For example, the security code may be set to be decodable by an RFID card that can control the door of room 301 of the Gangnam building.

This is to ensure that only the user or authorized personnel can open the tray in security-critical deliveries.

The user can release the security code by tagging the RFID card to the robot's reader at the delivery destination.

The RFID reader can read the data of the tagged card and verify the validity of the code by comparing it with the security protocol built into the robot. This can be applied to the embodiments of QR code and NFC tags as well.

That is, the security code can play a role in supporting the safe delivery of the delivery object to the destination. After reaching the delivery destination, the user can release the security by inputting the security code to the delivery robot at the delivery destination.

After that, if the security code is successfully verified, the processor can control the tray to open by sending an unlock signal of the tray (S542).

According to various embodiments, when a multi-story building provides hotel services, the security code can be set to a hotel room number or implemented so that the security code is decoded by a hotel room card.

Meanwhile, according to various embodiments of the present invention, there may be multiple delivery objects.

Hereinafter, the operation of the delivery robot in the case where there are multiple delivery objects will be described.

When Multiple Delivery Objects Exist

Figure 7:
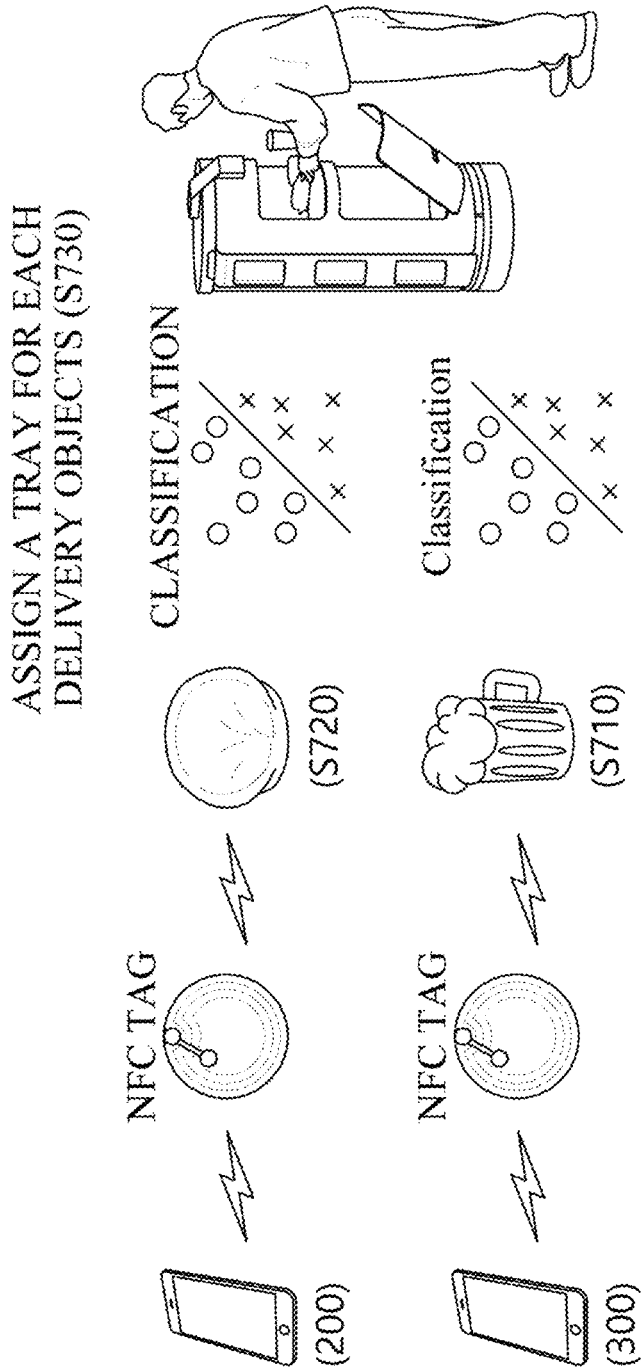
FIG. 7 is a diagram illustrating a plurality of delivery object loading operations according to an embodiment of the present invention.
Figure 8:
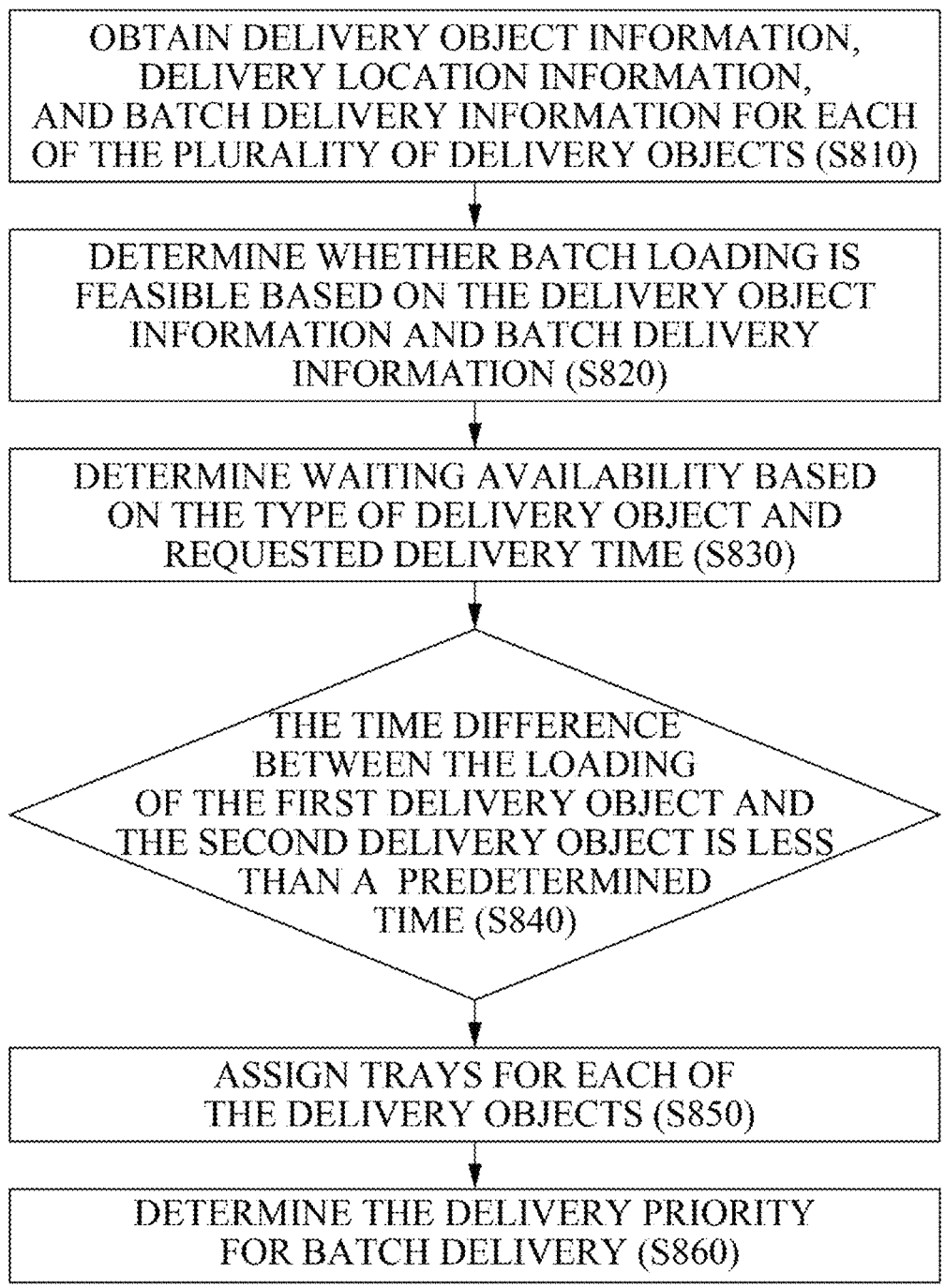
FIG. 8 is a flowchart illustrating a plurality of delivery object loading operations according to an embodiment of the present invention.

FIGS. 7 and 8 illustrate a conceptual diagram and a flowchart for performing an operation of a delivery robot when a plurality of delivery objects exist, according to an embodiment of the present invention.

FIGS. 7 and 8 hereinafter describe a delivery robot system for managing a delivery scenario when a plurality of delivery objects and delivery locations exist.

First, a case in which a plurality of delivery objects exist may include a case in which (1) a single user requests a plurality of delivery objects, and (2) a plurality of users each requests at least one delivery object.

First, in the case of (1) a plurality of delivery objects requested by a single user, one or more processors of the delivery robot may obtain delivery location information and delivery object information for each object and provide a delivery service as in the embodiments of FIGS. 5 and 6.

Hereinafter, a case in which (2) each of the plurality of users has requested at least one delivery object will be described.

Referring to FIG. 7, a first user may request delivery of a first delivery object using the first user terminal 200. Further, the second user may request delivery of a second delivery object using the second user terminal 300.

At this time, each of the first user and the second user may enter batch delivery information for the objects to be delivered.

In this case, the batch delivery information may refer to information indicating whether the user agrees at the time of ordering the delivery object whether he or she wishes to have his or her object delivered in a batch, bundle, or at the same time as another user's object.

To obtain the batch delivery information, the at least one user terminal 200, 300 may provide an interface that displays an option to select whether or not the user wishes to have the delivery object batched with the other user's object.

The above interface may be provided when a user selects an object to be delivered in a delivery application or a delivery website and enters delivery location information.

The respective batch delivery information obtained through the above user terminal may be transmitted to the application management server along with the order of the delivery objects, and may be delivered to the delivery robot along with the delivery object information and the delivery location information.

Referring to FIG. 7, the delivery robot may obtain delivery object information, delivery location information, and simultaneous delivery information for each of the plurality of delivery objects (S710, S720). Subsequently, a delivery may be performed by assigning a tray to each of the plurality of objects (S730) and determining a delivery priority of the first delivery object and the second delivery object. This will be described in detail below.

FIG. 8 is a flowchart illustrating a delivery operation of each of the plurality of delivery objects according to an embodiment of the present invention.

According to an embodiment of the present invention, one or more processors of the delivery robot may obtain delivery location information, object information, and batch delivery information for each of the plurality of delivery objects (first delivery object and second delivery object) (S810).

Specifically, the processor of the delivery robot may obtain the delivery object information, the delivery location information, and the batch delivery information of the first delivery object from the first information transmission medium.

In addition, the processor of the delivery robot may obtain the delivery object information, the delivery location information, and the batch delivery information of the second delivery object from the second information transmission medium.

As described above, the one or more processors of the delivery robot may acquire the delivery location information, the delivery object information, and the batch delivery information for each of the objects using short-range communication (e.g., NFC tags, QR codes, Bluetooth, RFID, etc.).

Each of the above information may be stored in a tag or information transmission medium attached to each delivery object, and the delivery robot may collect the data by scanning the tag or information transmission medium.

According to an embodiment of the present invention, the one or more processors 160 of the delivery robot may determine the feasibility of batch loading (S820) based on at least one of delivery object information, delivery location information, and simultaneous delivery information of each of the plurality of delivery objects.

First, at step S810, the one or more processors 160 may determine the feasibility of batch loading based on the object information of each of the plurality of delivery objects if the batch delivery information of each of the plurality of delivery objects is "possible.

According to the embodiment, if the simultaneous delivery information for the delivery object that arrived first is 'impossible', it would be desirable for the processor to perform a single delivery (S530).

According to an embodiment of the present invention, the processor (160) can determine whether simultaneous loading is possible based on at least one of the type of goods included in the delivery goods information, the delivery request time, and the difference in loading time between goods.

If simultaneous loading is possible, the processor (160) can determine whether the waiting time has elapsed based on the type and delivery request time of each of the plurality of delivery goods (S830). Similarly, if simultaneous loading is not possible, the processor performs operation S530.

According to an embodiment of the present invention, the simultaneous loading 'possible' may include a case where the difference in the expected loading time between the first and second goods among the plurality of delivery goods is less than a certain time.

That is, if the second object can be loaded within a predetermined time after the first object is loaded, the processor (160) can determine that the delivery objects can be delivered simultaneously.

Alternatively, the batch loading "possible" may include at least one of the cases where the estimated arrival time at the destination for the first object after the estimated loading time of the first object and the second object is within the delivery request time of the first delivery object.

In addition, the simultaneous loading 'possible' can include the case where each of the plurality of delivery objects can be loaded simultaneously on a single tray.

In specific embodiments, the processor may determine the feasibility of batch loading based on a type of delivery object. According to an embodiment of the present invention, the processor may determine the feasibility of batch loading on the tray based on the size, weight, shape, etc. of each of the plurality of delivery objects.

For example, certain objects may not be able to be loaded in batch loading due to physical constraints, such as size limitations of the plurality of trays or the absence of suitable trays.

First, the one or more processors may determine a loading location for the first delivery object using a trained artificial intelligence model.

The processor can check the specifications of the currently available tray using the tray image information acquired by the camera and determine the remaining space after loading the first delivery object. If the first delivery object takes up a large space or has a special shape, making it impossible to load the second delivery object on the tray, the processor can determine that simultaneous loading is not possible.

As in the embodiment described above, if batch loading of each of a plurality of delivery objects on the delivery robot is possible, the processor may assign each object to an appropriate tray based on the object information (S830).

When each delivery object is loaded onto an assigned tray, the processor can use a weight sensor and camera to check whether the loaded objects are correct, and plan the robot's path according to delivery priority to perform delivery.

Hereinafter, a method for determining a delivery priority for each of a plurality of delivery objects will be described.

According to an embodiment of the present invention, a processor may assign objects of the plurality of objects to each of a plurality of trays, and determine a delivery priority for the plurality of objects (S840).

The one or more processors may determine the delivery priority based on a travel time to a destination for each delivery object, a distance to the destination, an appropriate time to store the delivery object, and a type of delivery object.

For example, the processor may determine the delivery priority by calculating a route that minimizes the travel time based on the destination travel time.

Or, the one or more processors may determine the prioritization by considering an optimal amount of time that a particular object should be stored based on the optimal amount of time that the object should be stored.

Or, the one or more processors may determine the prioritization based on the nature of the object based on the type of object.

Meanwhile, unless there is a special limitation, it would be preferable for the processor to deliver the first delivery object that was loaded first.

More specifically, objects that require freshness, such as food, can be delivered first. Or, the processor can prioritize objects with a faster order time based on the order time.

Hereinafter, an embodiment is described in which a delivery robot performs route search (S450 of FIG. 4) and interacts with a vertical moving means in a multi-story building to deliver a delivery object to a destination.

Interaction Between Delivery Robots and Vehicles

According to an embodiment of the present invention, the one or more processors may perform path finding to generate a dynamic path based on the delivery object information and the delivery location information (S450).

Specifically, the path finding may be performed using a path planning algorithm. The path planning algorithm may refer to an algorithm that determines an optimal or shortest path from a starting point to a destination while avoiding obstacles.

For example, the path finding algorithm may be A* (A-star) algorithm, Dijkstra's algorithm, RRT (Rapidly-exploring Random Tree), PRM (Probabilistic Roadmaps), etc.

This enables the delivery robot to perform optimal route navigation in a multi-story building and travel along the navigated route.

On the other hand, the delivery robot may interact with a vertical transportation vehicle (S460) when vertical movement in the multi-story building is required.

Embodiments of interacting with the transportation means will be described below with reference to FIGS. 9 to 14.

When the delivery robot needs to make vertical movement using an elevator during delivery, the delivery robot may move to a boarding position of the elevator and board the elevator. The delivery robot may determine whether to get on, and after getting on, move with the elevator from the waiting position, move to the getting off position, prepare to get off, and get off to enable delivery to another floor.

Hereinafter, the steps before boarding the elevator will be described in FIGS. 9 to 11, and the steps after boarding the elevator and getting off will be described in FIGS. 12 to 15, respectively.

Figure 9:
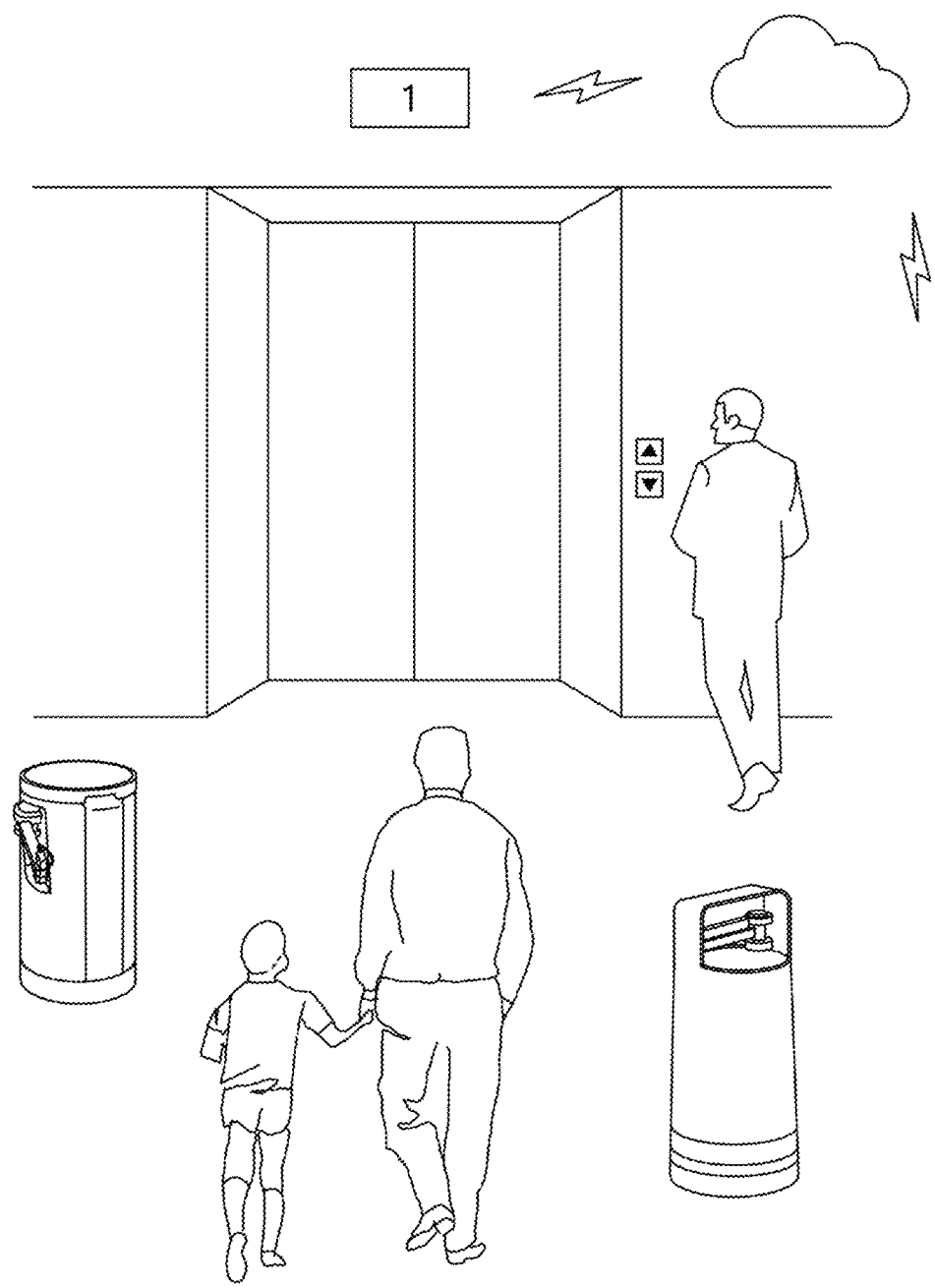
FIG. 9 is a diagram illustrating a delivery robot interacting with an elevator prior to boarding the elevator, according to an embodiment of the present disclosure.

FIG. 9 is a diagram illustrating the interaction of a delivery robot according to an embodiment of the present invention with an elevator before boarding the elevator.

When the delivery robot uses an elevator as a means of transportation, the processor may determine an elevator to enter, and may determine the waiting position for entering the elevator.

The delivery robot may include a robot that calls an elevator by communicating with an elevator control server and a robot that calls an elevator by inputting a call button with a robot arm, and in each case, the processor may determine a waiting position before boarding.

According to one embodiment of the present invention, the processor may obtain sensor information about an elevator waiting space to determine a waiting position for boarding.

In the case of a robot according to an embodiment of the present invention, information for determining a waiting position before boarding may include whether an elevator has been called and the position of a waiting passenger.

The processor can obtain floor information from the display that displays the location of the elevator through the sensing unit (130). It can also identify whether the call button has been input.

If the call button of the elevator has not been input, the processor can control the robot to move to a location for inputting the call button.

According to an embodiment of the present invention, in the case of a delivery robot that communicates with an elevator control server, the elevator control server can identify the boarding floor of the delivery robot and call a specific elevator to the boarding floor, so that the location for inputting the call button can be omitted.

Or, the processor can identify that the elevator call button has already been input and determine the boarding waiting location without considering the call button input.

If the call button input is not required, the processor can determine a location where a straight path to the elevator is possible as the boarding waiting location by considering the location of the waiting passenger.

According to an embodiment of the present invention, the processor can obtain passenger information of an elevator waiting space, generate a potential field, generate a map of an elevator boarding waiting space, and determine a waiting position.

The method for determining the waiting position before boarding is the same in principle as the method for determining the waiting position after boarding inside an elevator by generating an elevator map in FIG. 12, and therefore will be described later in FIG. 12.

Hereinafter, a method of operating a delivery robot before boarding an elevator will be described in more detail.

Figure 10:
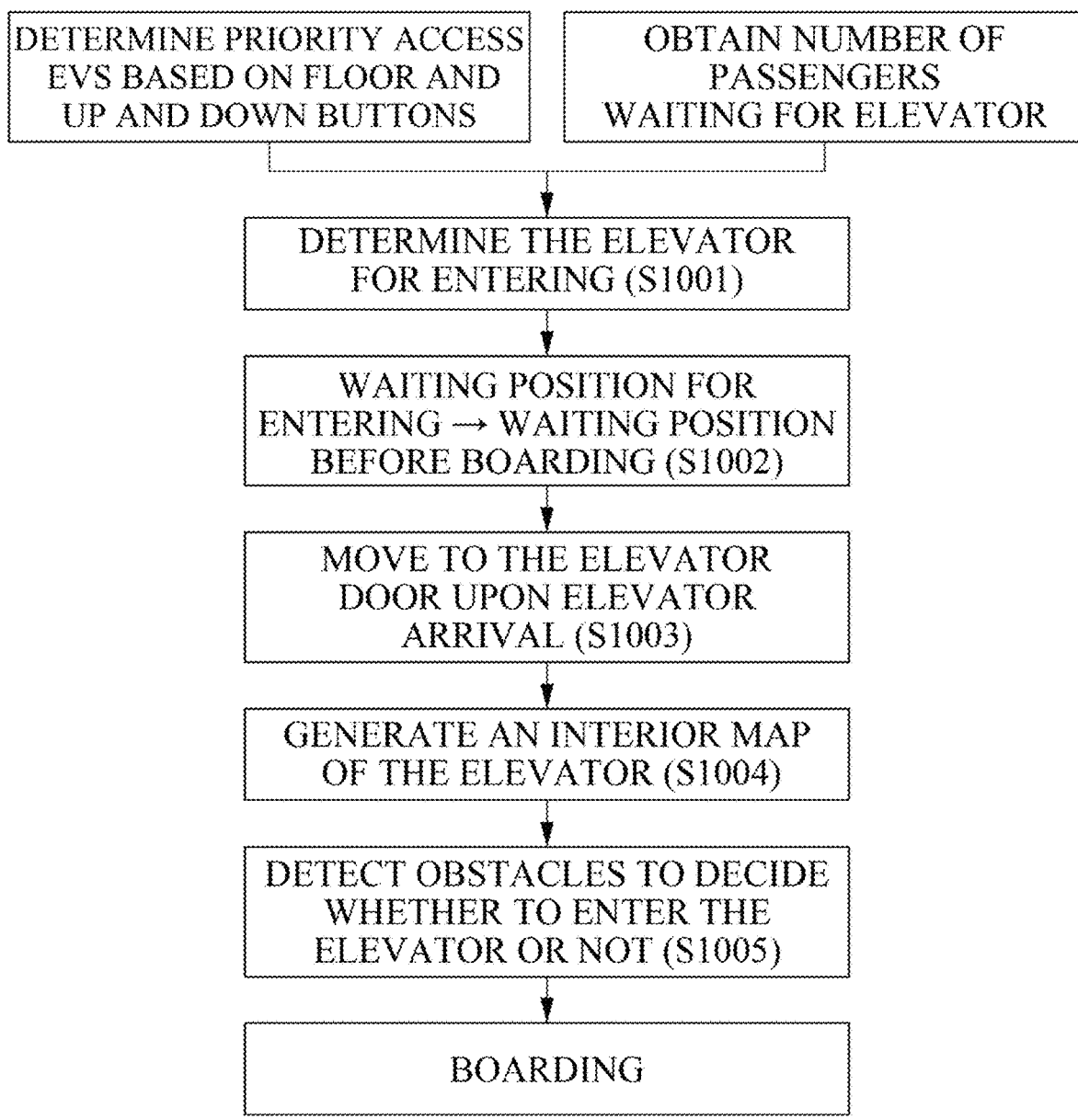
FIG. 10 is a flowchart illustrating a method of determining an elevator for entering, and entering the elevator, according to an embodiment of the present invention.

FIG. 10 is a flowchart illustrating a method of determining an elevator to be entered and entering the elevator, according to an embodiment of the present invention.

According to an embodiment of the present invention, one or more processors may identify an elevator that reaches a departure floor with priority based on floor number information of an elevator in operation and operation information, determine whether to enter the elevator based on waiting passenger information, and finally determine an entering elevator. (S1001)

The processor may determine a priority approaching elevator among the plurality of elevators, and may redetermine the entering elevator if more than a predetermined number of passengers waiting in the elevator are identified.

The one or more processors may obtain from a display indicating the location of the elevators, a current location of each elevator, a direction of travel, and an indication of whether the elevator is full, and may determine an arrival order of the plurality of elevators based on the obtained display information.

The one or more processors may determine an entering priority of the elevator based on the arrival order of the plurality of elevators.

In an embodiment of the present invention, the one or more processors may determine entering based on a number of waiting passengers in the first arriving elevator.

The one or more processors may obtain a distance of the passenger from each elevator, a torso orientation of the passenger, and the like. The processor may identify a waiting passenger per elevator based on the distance between the passenger and the respective elevator.

Alternatively, the processor may identify a direction vector for each passenger by recognizing a torso or head obtained from an image or video of the passenger, and may identify an elevator in which the passenger is waiting based on the recognized direction vector to calculate a number of waiting passengers per elevator.

The one or more processors may determine the elevator as an entering elevator when the number of waiting passengers of the first arriving elevator is below a set threshold.

If the number of waiting passengers of the elevator is above the set threshold, the processor may determine the elevator as unavailable for entering, and may determine the elevator to be finally entered by re-determining the number of waiting passengers of the elevator determined to arrive in the next order.

In S1002, the processor may control the delivery robot to move to a pre-boarding waiting position for entering the elevator.

The pre-boarding waiting position may be determined by considering whether an elevator call has been entered, and the straightness of the waiting passenger's position, as described in FIG. 9.

If a straight path to the determined elevator is not obtained, the delivery robot may return to S1001 again except for the determined elevator.

In S1003, the one or more processors may control the delivery robot to move to the door of the elevator when the elevator arrives at the boarding floor. The path of the delivery robot may be determined to be a straight path as determined by the determination of the pre-boarding waiting position.

In S1004, the delivery robot may generate an elevator map by obtaining an image of the interior of the elevator when the door of the elevator is opened. The information obtained from the elevator interior image may include the location and number of obstacles (passengers, robots).

In S1005, the processor can determine whether to board based on the generated elevator map. The processing process of the processor for boarding the interior of the elevator is described in FIG. 11 below.

In FIG. 10, the elevator map generated based on the image of the interior of the elevator is a map generated by dividing the interior space of the elevator into a plurality of grids and based on a potential field generated in the grid.

In this case, the potential field is a map that represents the interior of the elevator with artificial potentials by identifying obstacles in the elevator as obstacle potentials having repulsive potentials and determining destinations as destination potentials having attractive potentials.

The processor can determine whether to board the delivery robot, the boarding location, and the movement path based on the potential field.

Thereby, the one or more processors may calculate an optimal route, which may avoid obstacles and efficiently move to the destination.

The elevator map may vary based on the state of the delivery robot.

First, a case where the state of the robot is before boarding the elevator will be described.

Figure 11:
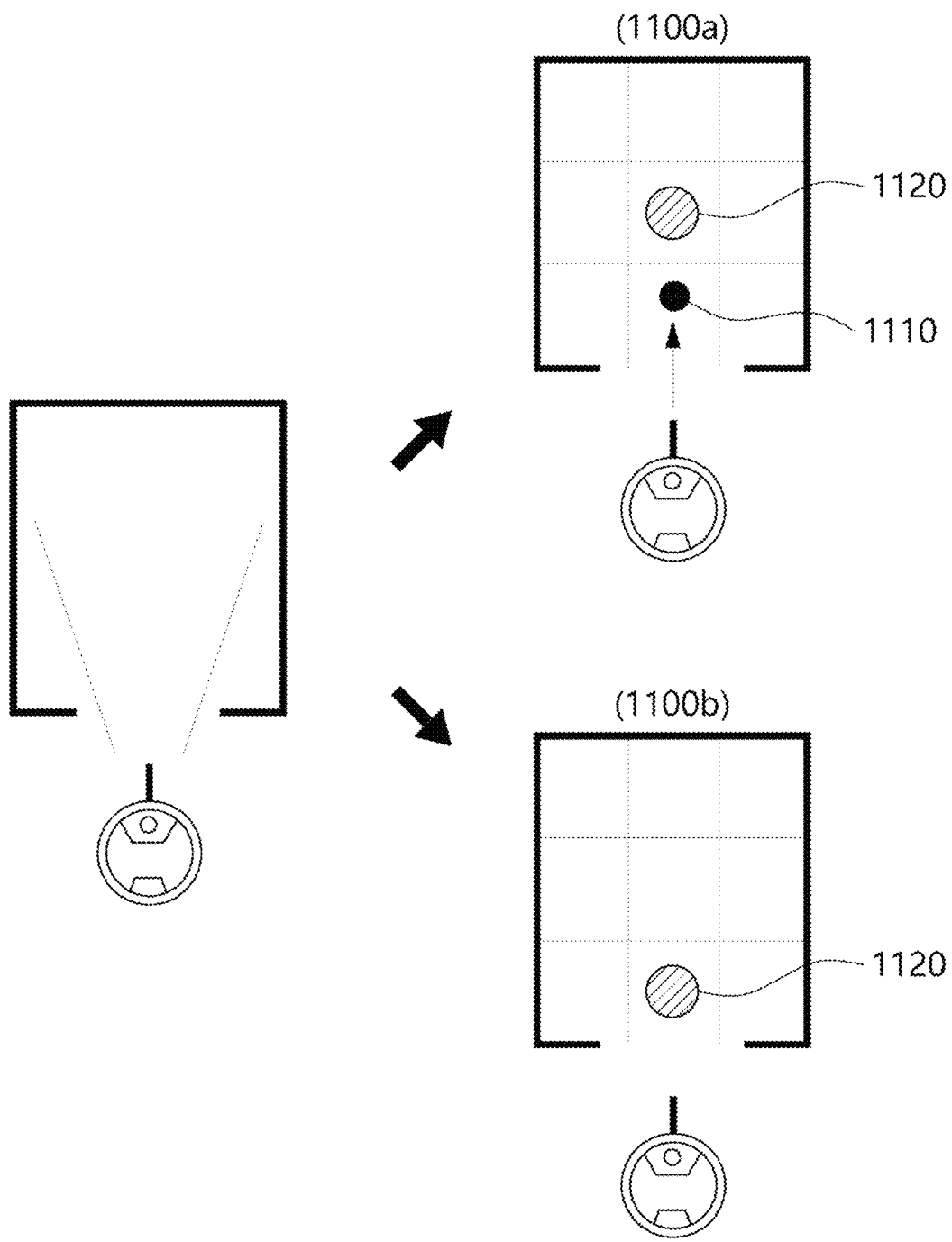
FIG. 11 is a diagram of a method for determining whether or not a delivery robot should board an elevator prior to boarding the elevator, according to an embodiment of the present invention.

FIG. 11 is a diagram of a method for determining whether a delivery robot is ready to board an elevator before boarding the elevator, according to an embodiment of the present invention.

According to an embodiment of the present invention, one or more processors may set a reference grid 1110 for determining whether entering the elevator is possible among a generated grid. The processor may determine entering based on whether an obstacle 1120 inside the elevator is located in the reference grid 1110.

According to one embodiment of the present invention, the processor may divide the detected interior area to separate the interior area into a grid. The grid may be obtained by the one or more processors by modeling the interior of the elevator as a 2D or 3D grid The criteria for dividing the interior region into a grid may take into account the size of the interior of the elevator, the width of the door, and the size of the robot. The size of the robot may be stored in the memory 150.

The one or more processors may set a horizontal or vertical length of the grid based on a diameter of the robot, such that the robot may be located in one grid.

The one or more processors may set a reference grid 1110 for determining to enter the elevator among the plurality of grids. In FIG. 11, the processor may set the criteria grid 1110 to be a grid that is adjacent to a door and must be passed to enter the interior of the elevator. The processor may then determine whether to enter the elevator based on the reference grid 1110.

The processor may determine entering the elevator 1100a if the obstacle 1120 is not located in the reference grid 1110; or, if the obstacle 1120 is located in the reference grid 1110, the processor may determine not entering the elevator 1100b.

If more than one grid exists that allows entry into the inside of the elevator, the processor may determine that all of the grids that allow entry into the inside of the elevator are reference grids. The one or more processors may determine that entering the elevator is not possible if all of the plurality of reference grids have obstacles. Further, the processor may allow entering if none of the plurality of reference grids have obstacles.

In an embodiment of the present invention, if an obstacle located on the reference grid 1110 is identified as dismounting, the processor may determine whether to board by determining whether the reference grid is obstructed after the dismounting of the obstacle.

Next, a case where the state of the robot is determined to be entering the elevator will be described.

Figure 12:
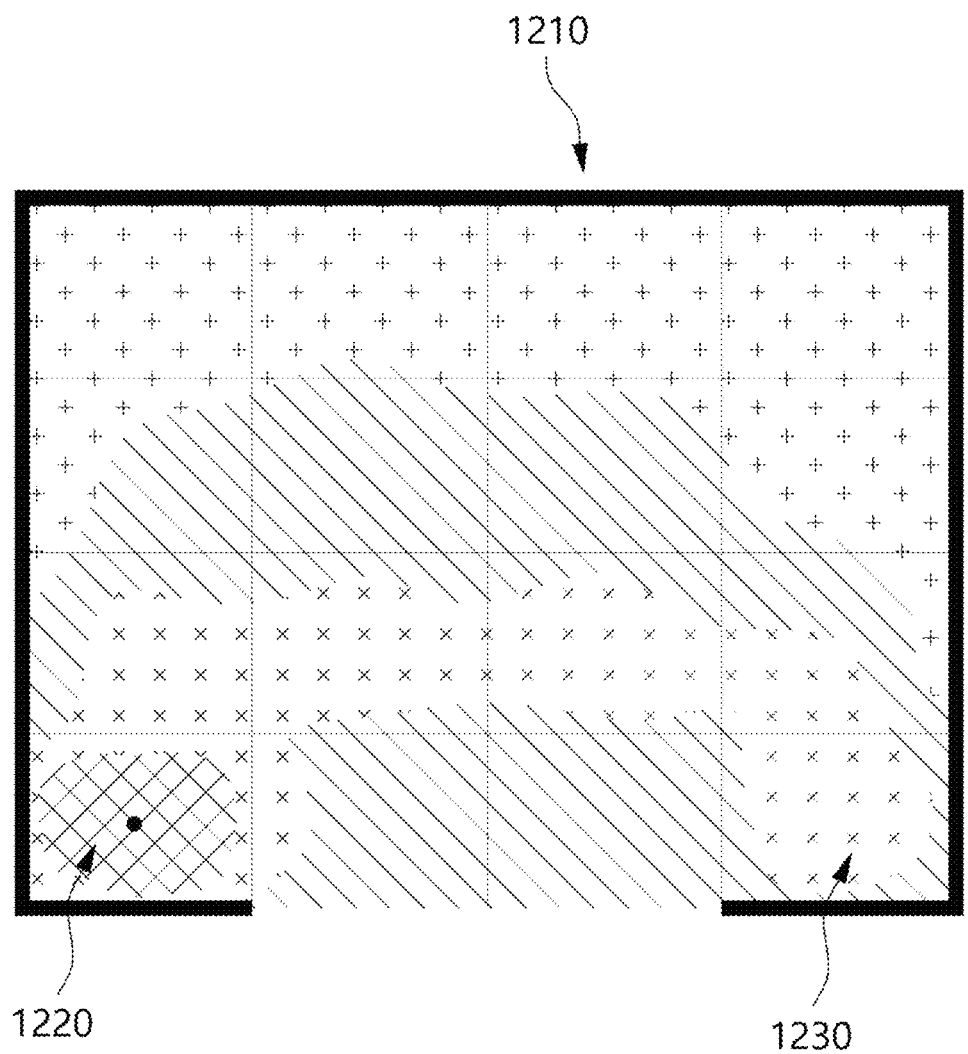
FIG. 12 is a diagram to illustrate a potential field for generating an elevator map according to an embodiment of the present invention.

FIG. 12 is a drawing to illustrate a potential field for generating an elevator map according to an embodiment of the present invention.

According to an embodiment of the present invention, a processor may, prior to boarding an elevator, obtain an image of an interior of the elevator, obtain a position of an obstacle inside the elevator from the interior image, calculate a potential value for a region inside the elevator based on the position of the obstacle, and generate an elevator map based on the potential value to determine a waiting position.

The one or more processors may calculate a potential value for a destination inside the elevator. The destination may include an elevator exit, a specific floor button, or the like, based on the state of the delivery robot.

Additionally, the one or more processors may calculate an obstacle potential value within the elevator. The obstacles may include entering passengers and other delivery robots.

The one or more processors may calculate a potential value of a region inside the elevator based on the destination potential and the obstacle potential, and may generate a potential field inside the elevator.

In this case, the closer to the destination, the lower the potential value, and the closer to the obstacle, the higher the potential value. The one or more processors may identify the location with the least potential value as the post-ride waiting location.

FIG. 12 illustrates one embodiment to illustrate utilizing a potential field to determine a position of a delivery robot. Referring to FIG. 12, one or more processors of the delivery robot may determine a first grid 1220 of a plurality of grids set inside the elevator as a waiting position after a ride.

The map associated with the position field determined by the one or more processors is not limited to FIG. 12, and may similarly be utilized for determining the alighting location. Further, the one or more processors may periodically update the potential field and recalculate the route based on real-time data to adapt to changes in the environment inside the elevator.

In FIG. 12, the area inside the elevator may be divided into a grid, and a method of generating an elevator map by further considering the priority of the grid is described in FIG. 13 below.

Figure 13:
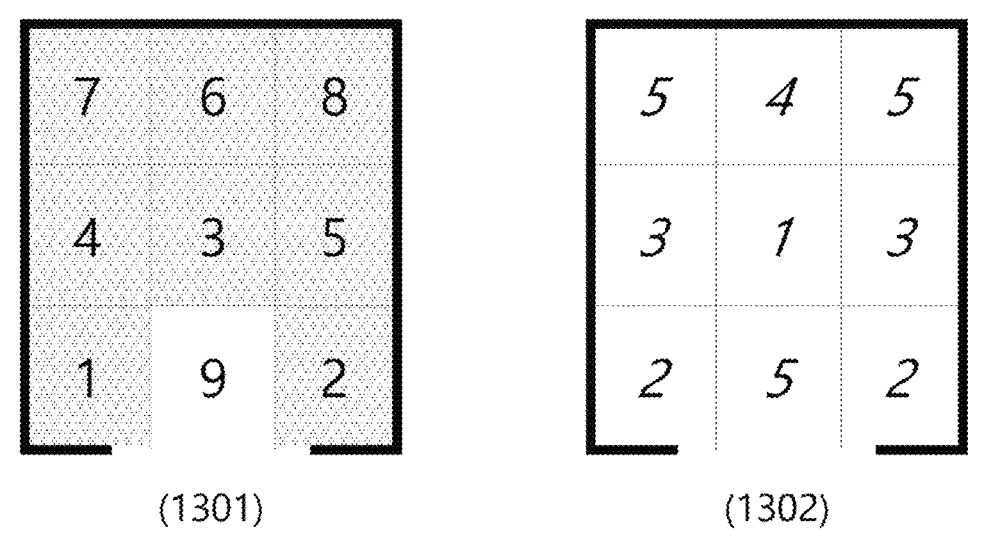

FIG. 13 is a conceptual diagram to illustrate prioritization by grid according to an embodiment of the present invention.

In the present invention, one or more processors may generate an elevator map based on obstacle potentials, destination potentials, and priorities set in a grid. In one example, the processor may calculate potential values by obstacles, but weighted by a preset grid-specific priority to determine a waiting position after a ride. The plurality of grids may be the same grids as the grids generated in FIG. 11.

In embodiments of the present invention, the prioritization of the grid may be set differently depending on the state of the delivery robot. The state of the robot may include when boarding, after button input, when exiting, etc.

In one example, the prioritization 1301 during boarding may take into account the location of the floor button, such that grids close to the location of the floor button may be given a higher priority.

For example, the first grid 1301 may have the highest priority among a plurality of grids present inside the elevator. Further, the grid to the left of the door may be given a higher priority than the grid to the right, and the grid in front of the door may be given a ninth priority, taking into account space utilization in the elevator.

In another embodiment, the second grid 1302 of the plurality of grids present inside the elevator may have the highest priority for exiting. This may be set in consideration of ease of exiting the elevator, i.e., the grid in front of the door may be assigned a priority of 5, and the grid that generates a straight path to the door may be assigned a priority of 1, in consideration of space utilization in the elevator. Further, the one or more processors may determine a second, third, and fourth priority based on the distance to the elevator door.

On the other hand, the method of calculating the potential field by replacing the destination potential with the priorities set in the grid may simplify the calculation process, which may result in a faster determination of the entering location.

Due to the confined nature of the interior space of an elevator, it may be more effective to use a priority in place of a destination potential value based on the size of the delivery robot and the interior space of the elevator than to derive a destination potential.

Grid priorities may also be determined differently depending on the number of elevator grids. For example, in FIG. 12, the grid including 1220 may be determined to have a lower priority in terms of elevator utilization for other passengers due to its closer location to the button. In this case, the grid including 1230 may be determined to be the standby location even though they have the same potential value.

Figure 14:
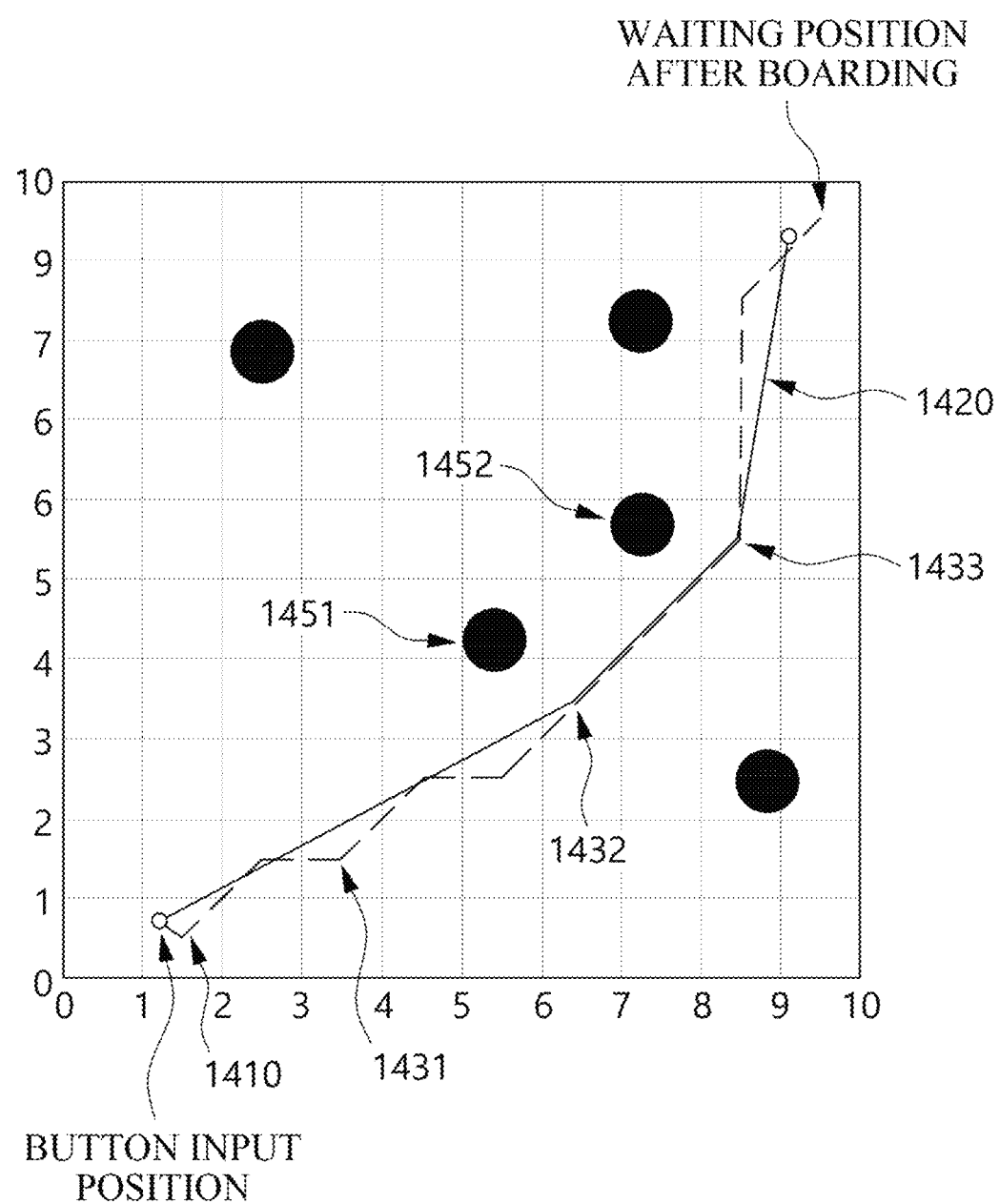
FIG. 14 is a diagram for illustrating a method for generating a path for a robot, according to embodiments of the present invention.

FIG. 14 is a diagram illustrating a method of generating a path for a robot according to an embodiment of the present invention.

In an embodiment of the present invention, one or more processors may generate a path to a standby location determined based on an elevator map.

The generated path may include a plurality of nodes representing respective location points that comprise the path of travel. The processor may identify direct route information to each of the nodes included in the path and may generate a final path by replacing the path with a direct route generated by the direct route information.

Referring to FIG. 14, the one or more processors may generate a path 1410 from a position for button input to a post-ride waiting position.

The one or more processors may generate the path 1410 by various algorithms, and exemplary algorithms may include the A* algorithm, Dijkstra's Algorithm, Greedy Best-First Search, Uniform Cost Search, Iterative Deepening A (IDA), Jump Point Search, Bidirectional A, etc.

The generated path 1410 may include a plurality of nodes 1431, 1432, 1433, 1434.

In one embodiment of the present invention, according to a method of generating a path based on a straight path, one or more processors may determine whether a straight path exists from a starting location to each of the nodes present on the path. If a straight path exists, the processor may replace the previously generated path with the straight path.

Referring to the drawings, in the existing path 1410, the path from the button input position to the first node 1431 and the paths between neighboring nodes are generated as straight lines.

The one or more processors may determine that the path from the button input position to the second node 1432 and the path to the third node 1433, respectively, can be generated as straight lines. The processor may determine that the path to the third node 1433 is not generated as a straight line by the obstacle 1452, and may replace only the distance to the second node with a straight line.

The processor can determine that the path from the second node (1432) to the third node (1433) can also be replaced with a straight path.

The processor can obtain the final path (1420) by determining the straight path from the starting position to each node as described above and updating the existing path.

The path update of the processor can be continuously processed according to the change in the position of the obstacle and the movement of the delivery robot. The processor can additionally consider the size (width, width, etc.) of the robot itself when determining whether a straight path can be generated.

In the foregoing, the method of determining each waiting position and the method of generating the movement path during the process of the delivery robot boarding the elevator were described through FIGS. 12 to 14. Hereinafter, the process of the delivery robot boarding and disembarking the elevator using the method described above will be described.

Figure 15:
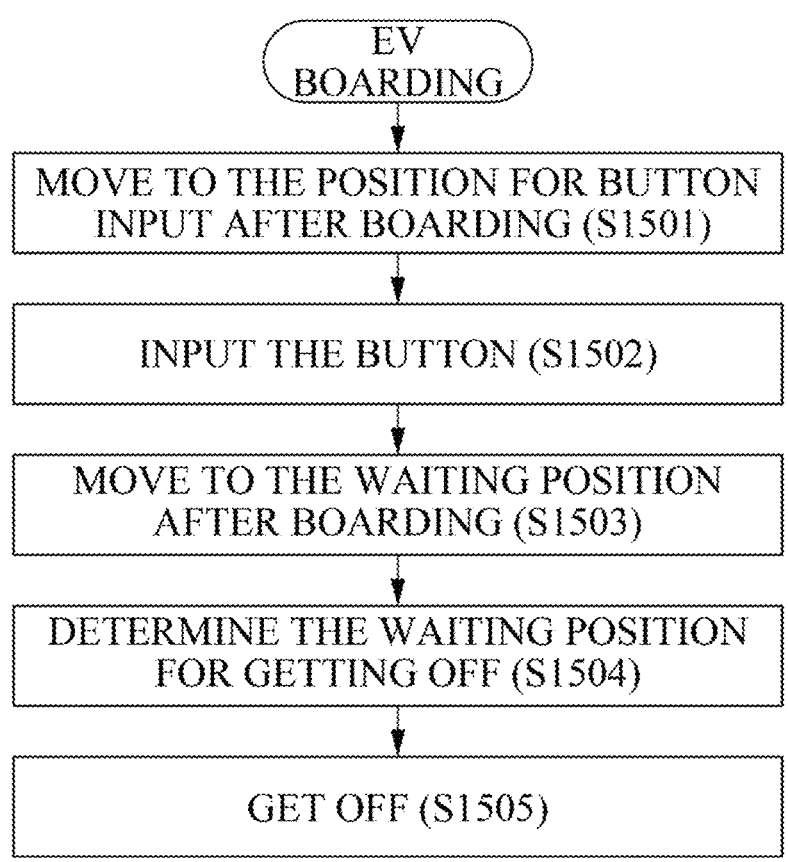
FIG. 15 is a flowchart illustrating a method of operation of a delivery robot after entering an elevator according to an embodiment of the present invention.

FIG. 15 is a flowchart showing the operation method of the delivery robot after boarding the elevator according to an embodiment of the present invention.

In S1501, the processor can move to a position for inputting a button inside the elevator. The position for inputting the button may be a position with the smallest potential in the elevator map among positions where button input is possible.

In an embodiment of the present invention, if there is already an obstacle in all grids adjacent to the button, the processor can control to send out a sound request signal for button input. The processor can set the sound request signal not to be generated any more if the destination floor button is pressed after the sound request signal.

In S1502, the delivery robot can move to the button input position and input the button. At this time, depending on the embodiment, security authentication for the button input of the elevator may be required.

According to an embodiment of the present invention, the security authentication of the elevator may be released when the delivery robot approaches the security authentication unit equipped in the elevator within a certain distance.

For example, when the robot moves to a grid adjacent to the button, the RFID may be released. Alternatively, when the end effector of the robot arm is adjacent to the button, the security authentication of the elevator may be released and the destination button input may be enabled.

After the input is completed, the processor may move the delivery robot to the waiting position after boarding. (s1503) Alternatively, the processor may recognize that the destination button has been input by another passenger or the robot before the button input and may move to the waiting position after boarding while moving to the position for button input.

The waiting position after boarding may be the position with the smallest potential among the entire interior of the elevator in the elevator map. The waiting position after boarding may be a position determined when sensing an interior image to determine whether to board the elevator. The processor may identify whether an obstacle exists again in the waiting position before moving after pressing the button.

If an obstacle exists in the waiting position after boarding, the processor may re-acquire an interior image of the elevator after pressing the button to generate an elevator map. Alternatively, the processor may determine a new waiting position by considering whether there is an obstacle after pressing the button in the previously generated elevator map.

In S1504, the processor may identify a smooth waiting position for the delivery robot to disembark and control the delivery robot to move.

The above-mentioned get-off waiting position is a position determined from an elevator map generated by reacquiring an image of the inside of the elevator while the elevator is moving. The grid priority for determining the get-off waiting position may be different from the priority at the time of boarding, as it further considers the ease of get-off, etc.

In one embodiment of the present invention, the time point for determining the get-off waiting position may be determined based on the time difference to the destination floor of the delivery robot, the floor difference, the air pressure difference, etc.

In one embodiment of the present invention, the processor may obtain information on the floor where the delivery robot is located based on the air pressure of the floor where the delivery robot is located. In order to minimize errors due to differences in weather and surrounding environment, the processor may set a new reference point each time the vehicle is boarded.

The air pressure is continuously acquired according to the movement of the elevator, and when the acquired air pressure reaches the air pressure for determining the get-off position, the one or more processors may determine the get-off waiting position.

In one embodiment of the present invention, the one or more processors may determine that the get-off waiting position is not moved if the difference between the potential value of the post-boarding waiting position and the get-off waiting position is less than or equal to a certain amount. Alternatively, the process of determining the waiting position for alighting may be omitted if a straight path from the waiting position after boarding to the door of the elevator is secured.

When the delivery robot reaches the destination floor, it may get off at the waiting position. (S1505)

In one embodiment of the present invention, upon arrival at the drop-off floor, the one or more processors may further include determining that the destination floor has been reached. The processor may determine whether the destination floor has been reached by comparing the obtained air pressure to an expected air pressure at the destination floor obtained based on the air pressure at the departure floor or based on the location information of the elevator obtained by the vision sensor.

The one or more processors may transmit a voice signal to queue up the passengers for prioritized get-off.

FIG. 15 may correspond to one embodiment of S460, but the present method of operation may be applied to suit various situations, such as omitting steps S1501 and S1502 when a destination button is input by another passenger while the delivery robot is moving to a position for inputting the button, and proceeding with step S1503 at a time when it is identified that the destination button is input. In other words, some sequences may be changed, omitted, or added to FIG. 15.

The above description is merely an exemplary description of the technical ideas of the present invention, and various modifications and variations will be apparent to those having ordinary skill in the technical field to which the invention belongs, without departing from the essential features of the invention.

Accordingly, the embodiments disclosed herein are intended to illustrate and not to limit the technical ideas of the present invention, and the scope of the technical ideas of the present invention is not limited by these embodiments. The scope of protection of the present invention shall be construed in accordance with the following claims, and all technical ideas within the scope thereof shall be construed as falling within the scope of the present invention.

What is claimed is:

1. A delivery robot capable of inter-floor delivery within a multi-story building for providing delivery services, comprising:
   a communication interface; and
   one or more processors,
   wherein the one or more processors are configured to:
   obtain delivery object information and delivery location information of the delivery object,
   determine a tray on which the delivery object is to be loaded based on the delivery object information,
   invoke a transportation means configured for inter-floor movement within the multi-story building to move to the delivery location,
   when recognizing that a floor included in the delivery location information has been reached, disembark the transportation means and move to a destination corresponding to the delivery location information,
   wherein the one or more processors are configured to, when determining the tray on which the delivery object is to be loaded, input the delivery object information into an artificial intelligence model trained to output tray selection information,
   wherein the artifical intelligence model is trained using labeled data that associates tray assignment conditions with corresponding types of delivery object information,
   and wherein the tray selection information indicates a specific tray that satisfies the assignment conditions based on the input delivery object information.

2. The delivery robot of claim 1,
   wherein the delivery object information and delivery location information are obtained using short-range communication, and wherein the short-range communication includes any one of NFC, RFID, WI-FI, and Bluetooth.

3. The delivery robot of claim 1,
   wherein the delivery robot includes a weight sensor provided on the tray and a camera capable of capturing the tray, and
   wherein the one or more processors are configured to obtain weight information of the tray and image information of the delivery object using the weight sensor and the camera,
   compare the obtained weight information and the delivery object image information with the delivery object information, and
   determine whether the delivery object is placed on the tray to be loaded.

4. The delivery robot of claim 1,
   wherein the one or more processors, when determining that the delivery object is loaded on the tray, are configured to set a security code for the delivery object based on the destination information included in the delivery location information.

5. The delivery robot of claim 1,
   wherein the delivery object information includes at least one of weight, image, size, type, or storage temperature of the delivery object.

6. The delivery robot of claim 1,
   wherein the one or more processors are configured to recognize a plurality of delivery objects,
   obtain delivery location information, delivery object information, and batch delivery information for each of the plurality of delivery objects,
   wherein the batch delivery information of each of the plurality of delivery objects is possible,
   determine the batch loading based on the delivery object information of each of the plurality of delivery objects, and
   determine a delivery priority for each of the plurality of delivery objects.

7. The delivery robot of claim 6,
   wherein the one or more processors, when determining the feasibility of batch loading, are configured to determine a waiting availability based on a type of each delivery object and a requested delivery time,
   wherein the difference between the estimated loading time of a first object and a second object of the plurality of delivery objects is less than a predetermined time,
   wherein each of the plurality of delivery objects is capable of batch loading on the tray, or when the destination arrival time for the first object and the second object after the first object and the second object are loaded is within the delivery request time of the first object.

8. The delivery robot of claim 6,
   wherein the one or more processors are configured to, when determining the delivery priority for each of the plurality of delivery objects,
   determine the delivery priority based on at least one of the floor travel time, appropriate storage time, type of the delivery object, or order time for each of the plurality of delivery objects included in the delivery object information.

9. The delivery robot of claim 6,
   wherein the one or more processors are configured to assign each of the plurality of delivery objects to each of the plurality of trays.

10. A method for operating a delivery robot capable of inter-floor delivery within a multi-story building, the method comprising,
    obtaining delivery object information and delivery location information of the delivery object;
    determining a tray on which the delivery object is to be loaded based on the delivery object information;
    invoking a transportation means configured for inter-floor movement within the multi-story building to move to the delivery location;
    recognizing that the destination floor included in the delivery location information has been reached; and
    disembarking from the transportation means,
    wherein determining the tray on which the delivery object is to be loaded comprises inputting the delivery object information into an artificial intelligence model trained to output tray selection information,
    wherein the artifical intelligence model is trained using labeled data that associates tray assignment conditions with corresponding types of delivery object information,
    and wherein the tray selection information indicates a specific tray that satisfies the assignment conditions based on the input delivery object information.

11. The method of claim 10,
    wherein obtaining the delivery object information and the delivery location information comprises obtaining the delivery object information and the delivery location information using short-range communication, and
    wherein the short-range communication includes any one of NFC, RFID, WI-FI, and Bluetooth.

12. The method of claim 10,
further comprising the steps of obtaining weight information of the tray and image information of the delivery object, and
comparing the obtained weight information and the delivery object image information with the delivery object information to determine whether the delivery object is placed on the tray to be loaded.

13. The method of claim 10, further comprising setting a security code for the delivery object based on the destination information included in the delivery location information after determining the tray on which the delivery object is to be loaded based on the delivery object information.

14. The method of claim 10
wherein obtaining the delivery object information and the delivery location information comprises, when a plurality of delivery objects are present, obtaining delivery location information, delivery object information, and batch delivery information for each of the plurality of delivery objects, and
wherein, when the batch delivery information for each of the plurality of delivery objects is possible,
further comprising determining the feasibility of batch loading based on the delivery object information of each of the plurality of delivery objects, and determining a delivery priority for the plurality of delivery objects.

15. The method of claim 14,
wherein determining the feasibility of batch loading comprises determining a waiting availability based on the type and delivery request time of each of the plurality of delivery objects, and wherein, when the expected loading time difference between a first object and a second object of the plurality of delivery objects is less than a predetermined time,
the step further comprises determining that the plurality of delivery objects can be batchly loaded on the tray, or determining that the first object and the second object can wait if the destination arrival time for the first object and the second object, after the first object and the second object are loaded, is within the delivery request time for the first object.

16. The method of claim 14,
wherein determining the delivery priority for the plurality of delivery objects comprises determining the delivery priority based on at least one of the floor travel time, appropriate storage time, type of the delivery object, or order time for each of the plurality of delivery objects included in the delivery object information.

\* \* \* \* \*